US 6,609,044 B1

(12) United States Patent
Basista et al.

(10) Patent No.: US 6,609,044 B1
(45) Date of Patent: *Aug. 19, 2003

(54) METHOD AND APPARATUS FOR A CUTTING SYSTEM FOR AVOIDING PRE-CUT FEATURES

(75) Inventors: Thomas A. Basista, Mentor, OH (US); Scott Bockbrader, Fairfield, OH (US)

(73) Assignee: Cincinnati Incorporated, Cincinnati, OH (US)

( * ) Notice: Subject to any disclaimer, the term of this patent is extended or adjusted under 35 U.S.C. 154(b) by 332 days.

This patent is subject to a terminal disclaimer.

(21) Appl. No.: 09/672,357

(22) Filed: Sep. 28, 2000

Related U.S. Application Data

(63) Continuation of application No. 08/723,918, filed on Sep. 30, 1996, now Pat. No. 6,128,546.

(51) Int. Cl.[7] ............................................. G06F 19/00
(52) U.S. Cl. .................. 700/166; 700/173; 700/182; 700/191; 219/121.78; 219/121.82; 219/121.67
(58) Field of Search ............................... 700/166, 173, 700/182, 191, 97, 17, 117, 122, 127, 144, 159, 160, 167; 219/121.78, 121.82, 121.66, 121.67, 121.83, 121.72, 121.73, 121.75, 121.79; 29/563, 564, 565

(56) References Cited

U.S. PATENT DOCUMENTS

| | | |
|---|---|---|
| 4,513,366 A | 4/1985 | Munekata et al. |
| 4,764,873 A | 8/1988 | Libby |
| 4,905,310 A | 2/1990 | Ulrich |
| 4,939,664 A | 7/1990 | Nankaku |
| 4,951,217 A | 8/1990 | Clack et al. |
| 5,088,181 A | 2/1992 | Jeppsson |
| 5,227,606 A | 7/1993 | Weeks et al. |
| 5,340,962 A | 8/1994 | Schmidt et al. |
| 5,359,872 A | 11/1994 | Nashiki |
| 5,550,346 A | 8/1996 | Andriash et al. |
| 5,584,016 A | 12/1996 | Varghese et al. |
| 5,614,115 A | 3/1997 | Horton et al. |
| 5,635,086 A | 6/1997 | Warren, Jr. et al. |

OTHER PUBLICATIONS

A Letter of Jan. 16, 1996 from George Powers of Radan CIM, Inc. to Gus Pelsor of Cincinnati Incorporated.
A Letter of Jan. 24, 1996 from George Powers of Radan CIM, Inc. to Gus Pelsor of Cincinnati Incorporated.
Affidavit of Michael D. Lundy, President and CEO of Optimation, Inc. and exhibits attached thereto.
Affidavit of S. Turner Allen, Chairman of Optimation, Inc. and exhibits attached thereto.
Letter from Wm. Bruce Day to Frederick H. Gribbell.

Primary Examiner—Ramesh Patel
(74) Attorney, Agent, or Firm—Wood, Herron & Evans, LLP

(57) ABSTRACT

An improved laser cutting apparatus is provided that optimizes the amount of time required to perform all of the required cuts in a piece of sheet material. The optimization minimizes the amount of rapid-travel movement of the laser head, and virtually eliminates all head-up/head-down movements of the laser head. In one embodiment, the present invention performs a method that accepts NC code that has already been created by a conventional software product produced by a CAD/CAM vendor, and analyzes that NC code to create an optimized part program. The NC code is broken down and analyzed as a series of individual shapes to be cut by the laser head. Once the required shapes are known, a "sweep" is made to determine how many cut-outs are in each "band" being analyzed across the surface of the sheet material to be cut. The number of bands and the types of sweep are varied to analyze different possibilities of rapid-travel distance while still eliminating all head-up/head-down movements of the laser head. The order in which the cut-outs are to be cut within a particular band is analyzed, and the placement and direction of the lead-in for each of the cut-outs are determined. Each "sweep-type" for multiple numbers of bands are investigated so as to calculate the rapid-travel distance for each of the possibilities, thereby determining the minimum rapid-travel distance possible for the particular series of cut-outs to be made on this sheet material.

34 Claims, 27 Drawing Sheets

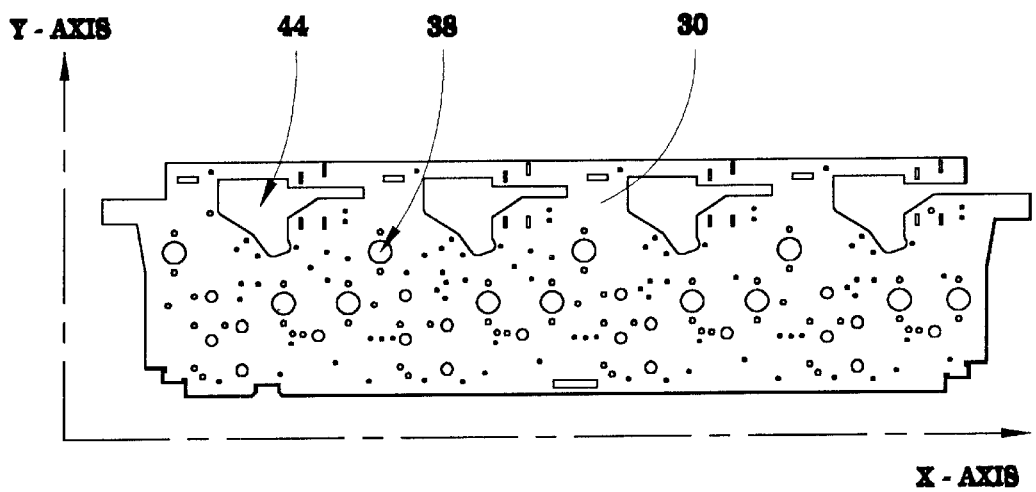
FIG. 3
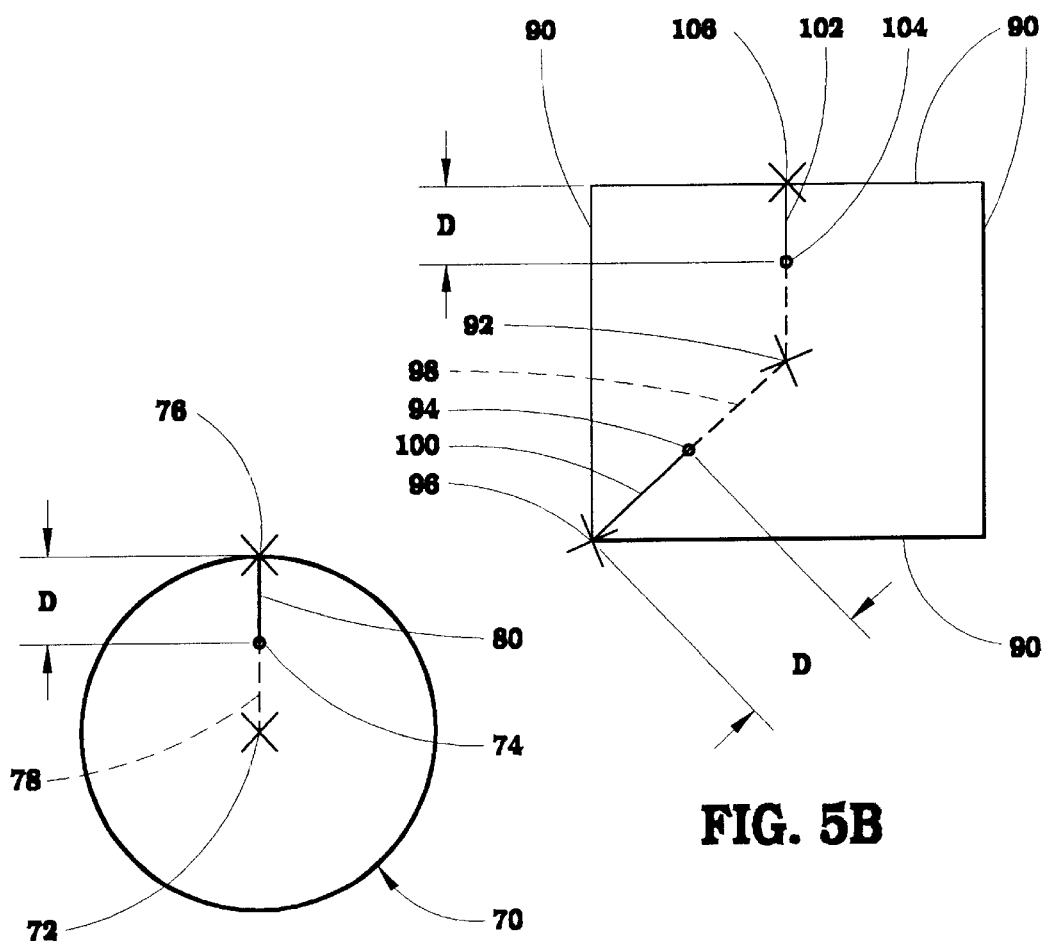
FIG. 5B
FIG. 5A

METHOD AND APPARATUS FOR A CUTTING SYSTEM FOR AVOIDING PRE-CUT FEATURES

This Application is a continuation of application Ser. No. 08/723,918 filed on Sep. 30, 1996 now U.S. Pat. No. 6,128,546.

TECHNICAL FIELD

The present invention relates generally to laser cutting machine tools and is particularly directed to laser cutters of the type which cut patterns in sheet material under the control of a programmable logic controller or a computer numerical controller. The invention is specifically disclosed as a "head-down" laser cutter in which the movements of the laser head are pre-determined so as to not pass over an area of the material that has already been cut, thereby eliminating any head-up/head-down laser head movements that would otherwise be necessary, while at the same time minimizing the rapid-travel distance of the laser head to make all required cuts.

BACKGROUND OF THE INVENTION

Laser cutting tools have been available for years which have the capability of cutting through various material types and thicknesses, typically utilizing a piece of sheet stock material. Conventional laser cutters, such as the Model CL-5 CNC Laser Center, manufactured by Cincinnati Incorporated, typically have a laser head assembly that moves in one direction with an attached laser head that moves in the perpendicular direction. Such conventional laser cutters are typically controlled by a sophisticated computer numeric controller (CNC), which operates according to a group of instructions called "NC code" which is a specific set of instructions for determining the cutting pattern that creates a series of shapes out of a sheet of material. Conventional laser cutters are usually powerful enough to cut through metal materials, including aluminum and steel, and in some cases, the thickness of such metal materials can be as great as one-half inch.

To properly utilize a laser cutter, a computer-aided design file (i.e., a "CAD"-file) is created to define the shapes of all of the parts that are to be made from a single sheet of material. In many cases, such parts are repeated several times in one sheet of material, however, using the technology available today, parts having several different sizes and shapes can all be made out of one sheet of material, and the creator of the CAD-file normally attempts to obtain as many parts as possible from a single sheet of material.

The CAD-file is typically in the form of an "IGES" (Initial Graphics Exchange Specification) or "DXF" (Drawing Interchange File) format, which are industry standards used in the computer-aided drafting industry. After a pattern has been created for one particular part, this pattern can be either replicated, or added to other patterns that create parts having other sizes and/or shapes. This process of placing several different parts to be cut from one sheet of material is known as "nesting." Once the CAD-file (in either an IGES or DXF format) has been prepared for the entire sheet of material to be cut by the laser head, the CAD-file is further processed to generate "NC code," which now generates the necessary commands to control the movements of the laser head to perform the actual cutting operations needed to create the physical parts from the sheet material.

The step of generating NC code is often referred to as "post-processing." This terminology is sometimes used to refer to the fact that the CAD-file for the entire sheet material has already been completely created, however, further manipulations or "processing" must be performed to add special command codes that cause the laser head to actually perform the movements necessary in the cutting operations. This NC code is also sometimes referred to as a "part program," and typically utilizes computer software provided by companies known as "CAD/CAM vendors." Examples of CAD/CAM vendors are: Optimation, located in Independence, Mo.; Measurement Masters, located in California; Metalsoft, located in California; Teksoft, located in Phoenix, Ariz.; and Merry Mechanization, located in Florida.

When a CAD/CAM vendor creates a software product that creates NC code, the CAD/CAM vendor typically must make such software product to be compatible with a specific manufacturer of laser cutters, such as Cincinnati, Incorporated. The act of creating the NC code is quite sophisticated, because the CAD/CAM software must scan the entire CAD-file to determine what cuts must be made in the sheet of material. To optimize the use of the laser cutter, the CAD/CAM software will typically attempt to discover the quickest way to move the laser head to perform all of the necessary cuts. Such head movements can include very fast X-Y movements (also known as "rapid-travel" movements), either with the head in its "up" position or its "down" position. In addition, the movements of the laser head must be controlled at a standard "cutting rate," which is the velocity at which the laser head moves parallel to the top surface of the sheet material while making a cut with the laser beam turned on. Each laser cutter typically will have a different cutting velocity for different types of materials and for different material thicknesses. As is well known in the art, the laser cutter cannot effectively be moved faster than the time required for the laser beam to cut entirely through the thickness of the material at each incremental distance along the surface of the sheet material.

Conventional CAD/CAM software products attempt to minimize the amount of time that the laser head is moving in a fast-travel mode, because this essentially is the mode that can be most easily manipulated. The slower cutting velocity mode cannot be easily increased so as to decrease the total amount of time needed to make all of the cuts, because the laser head must literally make every cut in the sheet material at a certain rate before the step of cutting is completed. It is possible to vary "lead-in" movements to minimize the (slower) cutting velocity mode cumulative time, however, the great proportion of time in this cutting mode is spent actually making the cuts. Therefore, the most significant amount of time that may be saved is in the faster ("rapid") travel mode, and in the number of head-up/head-down movements of the laser head.

Head-up/head-down movements are typically required in conventional laser cutters so that the laser head can pass over an area of the sheet material that already has had a part previously cut without colliding with any skewed parts. As can be seen in FIG. 2, if a relatively large portion of the sheet material is cut out, it may not be able to completely fall down onto the machine bed, and therefore, may have a portion that extends above the plane in which the tip of the laser head operates. The laser head can easily be damaged if it is allowed to impact against a piece of material that protrudes above the planar surface of the sheet material being cut, and such damage can be very expensive because of the high price of laser cutting heads. In addition, it is desirable for the laser head to also avoid previously cut areas where a relatively large cut-out has been made, to prevent a non-contact laser head from "diving" into this large open area, and to prevent the head from impacting against the internal edge of this cut-out.

SUMMARY OF THE INVENTION

Accordingly, it is a primary object of the present invention to create a special part program comprising NC code that optimizes the high-speed rapid-travel movements of a laser cutting head used in cutting sheet material, while eliminating all head-up/head-down movements of the laser head.

It is another object of the present invention to create an optimized part program comprising NC code that inspects multiple ways of sweeping through the necessary cuts defined in the CAD-file to determine the minimum amount of high-speed rapid-travel of the laser cutting head used in cutting sheet material, while eliminating all head-up/head-down movements of the laser head.

It is a further object of the present invention to create an optimized part program comprising NC code that manipulates the angle and placement of lead-ins for each of the cut-outs to be made in a sheet material, so as to minimize the amount of rapid-travel distance required by the laser cutting head while performing the cutting operations.

It is yet another object of the present invention to create a part program comprising NC code that minimizes the amount of high-speed travel of the laser cutting head used in cutting sheet material, and also minimizes the number of head-up/head-down movements of the laser cutting head while performing the cutting operations.

Additional objects, advantages and other novel features of the invention will be set forth in part in the description that follows and in part will become apparent to those skilled in the art upon examination of the following or may be learned with the practice of the invention.

To achieve the foregoing and other objects, and in accordance with one aspect of the present invention, an improved laser cutting apparatus is provided that optimizes the amount of time required to perform all of the required cuts in a piece of sheet material, in which the optimization minimizes the amount of rapid-travel movement of the laser head, and virtually eliminates all head-up/head-down movements of the laser head. In one embodiment, the present invention accepts NC code that has already been created by a conventional software product produced by a CAD/CAM vendor, and analyzes that NC code to create an optimized part program. In this first embodiment, the NC code is broken down and analyzed as a series of individual shapes to be cut by the laser head. Once the required shapes are known, the present invention performs a "sweep" to determine how many cut-outs are in each "band" being analyzed across the surface of the sheet material to be cut. The number of bands and the types of sweep are varied to analyze different possibilities of rapid-travel distance while still eliminating all head-up/head-down movements of the laser head. As a refinement, the first embodiment analyzes the order in which the cut-outs are to be cut within a particular band, and also determines the placement and direction of the lead-in for each of the cut-outs. This is all done for each "sweep-type" and for each number of bands so as to calculate the rapid-travel distance for each possibility, thereby determining the minimum rapid-travel distance possible for the particular series of cut-outs to be made on this sheet material.

Since the ultimate goal is to minimize the amount of rapid-travel distance, and thereby minimize the amount of time required to make all of the required cuts in the sheet material, the present invention repeatedly selects a type of "sweep" and a given number of "bands" to repeatedly analyze the order in which the cut-outs would be made. After each analysis has occurred, the rapid-travel distance is stored so as to be compared against later calculations for that same quantity. Assuming a particular type of sweep, the number of bands initially is typically set to a value of one (1) band for the initial analysis step. Another analysis step is performed after incrementing the number of bands, and further analysis steps are performed up through a maximum number of bands typically in the range of twenty (20) to thirty (30). This incrementing the number of bands is preferably performed for each sweep type, before making the final determination as to the minimum rapid-travel distance. After each sweep has taken place for a particular number of bands, if the most recent cumulative rapid-travel distance is less than that previously stored, then that particular part program is stored as the provisional "best" possibility with regard to minimum cutting times.

In the first embodiment, only possibilities that require no head-up/head-down movements of the laser head are considered. In a second embodiment, if it is impossible to find any solutions that provide zero head-up/head-down movements, then the present invention will perform all of the calculations related above while allowing at least one head-up/head-down movement to be included in the part program. In this second embodiment, the present invention will determine not only the minimum rapid-travel distance, but especially the minimum number of head-up/head-down movements that would be needed to perform all of the required cut-outs in the sheet material.

In all embodiments, it is preferred that more than one sweep type be considered when analyzing the minimum cumulative rapid-travel distance. Examples of sweep types include: (1) X-sweep, (2) Y-sweep, (3) Radial Wave, inside-out (using concentric circles), (4) Radial Wave, outside-in, and (5) Radial Pie.

Still other objects of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

FIG. 3 is a top plan view of a sheet of material after it has been cut on a laser cutting machine, as relevant to the present invention.

FIG. 5A is a plan view of a circular cut-out made by the laser cutting machine of FIG. 1, showing the details of the lead-in.

FIG. 5B is a plan view of a rectangular cut-out made by the laser cutting machine of FIG. 1, showing the details of the lead-in.

DETAILED DESCRIPTION OF THE PREFERRED EMBODIMENT

Reference will now be made in detail to the present preferred embodiment of the invention, an example of which is illustrated in the accompanying drawings, wherein like numerals indicate the same elements throughout the views.

Figure 1:
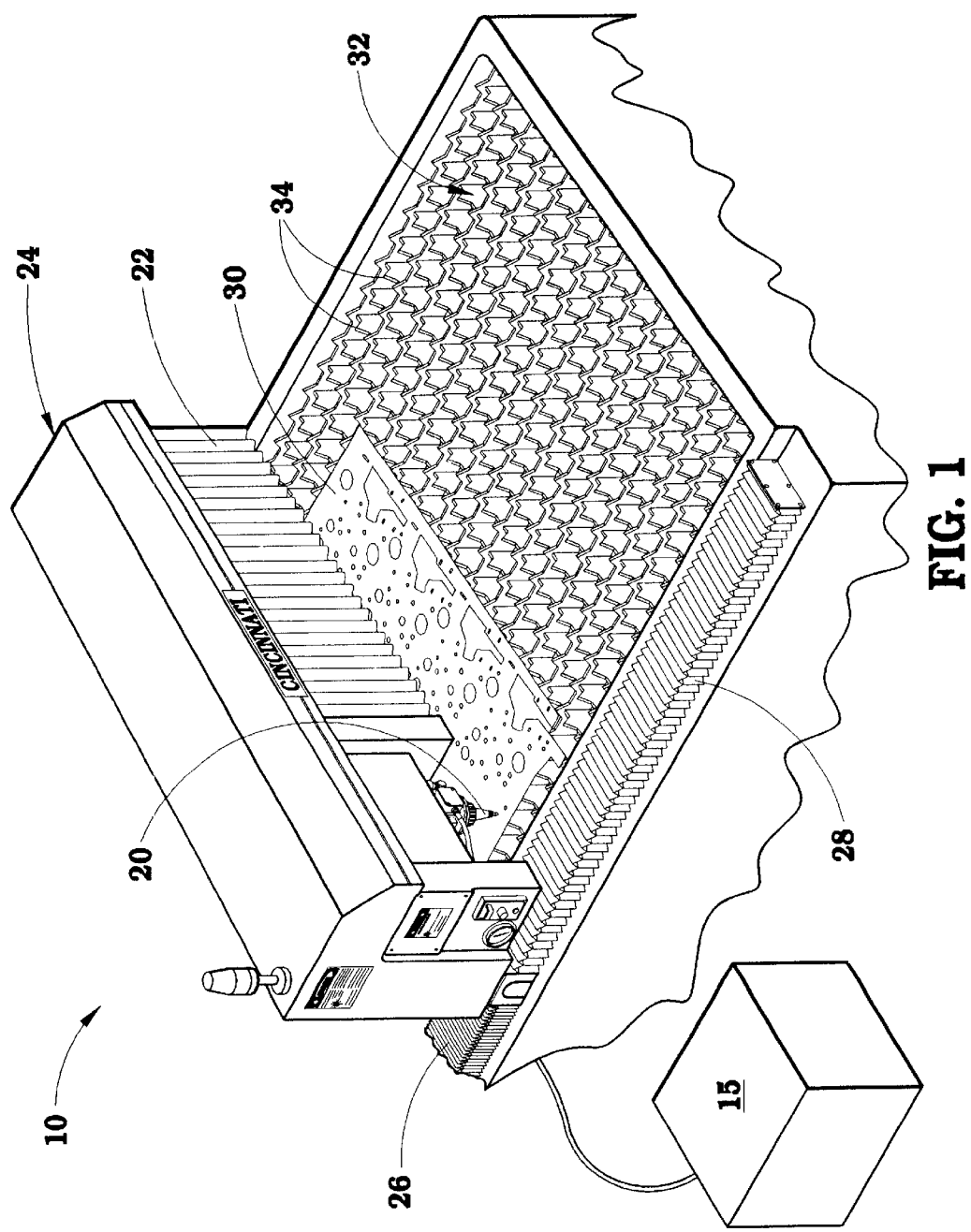
FIG. 1 is a perspective view of a laser cutting machine constructed according to the principles of the present invention.

Referring now to the drawings, FIG. 1 shows a laser cutting machine, generally designated by the index numeral 10, which is capable of moving the laser head in any direction parallel to the surface of a piece of sheet material that is to be cut into specific shapes. In this illustrated embodiment, the laser head, designated by the index numeral 20, is a non-contact device which typically would maintain a precise distance when in its "down" position, such as 0.050 inches, from the tip of the laser head to the top surface of the sheet material being cut. It will be understood that other types of laser heads, including "contact"-type heads could be utilized without departing from the principles of the present invention.

The laser head 20 is mounted on a carriage so as to be able to move back and forth in a linear direction perpendicular to the longitudinal dimension of the main table of the laser cutting machine. As laser head 20 traverses in this perpendicular direction, an accordion-like curtain designated by the index numeral 22 can be compressed or extended, accordingly. The entire laser head carriage structure, designated by the index numeral 24, is also capable of movement in the longitudinal direction along the main axis of the machine 10, and an accordion-like curtain on either side of the laser head structure, designated by the index numerals 26 and 28, can either compress or expand, accordingly. The movements of laser head 20 are typically controlled by a sophisticated computing device, such as a programmable logic controller or a computer numerical controller, as designated by the index numeral 15.

On FIG. 1, a planar part made of a sheet material, generally designated by the index numeral 30, is placed on top of a special bed-like structure, indicated by the index numeral 32. Bed-like structure 32 is made up of an X-Y grid structure of relatively thin metal sheet material, which is constructed to create multiple "points" which support the bottom surface of the sheet material 30. These points, designated by the index numeral 34, can be seen on both FIGS. 1 and 2.

Figure 2:
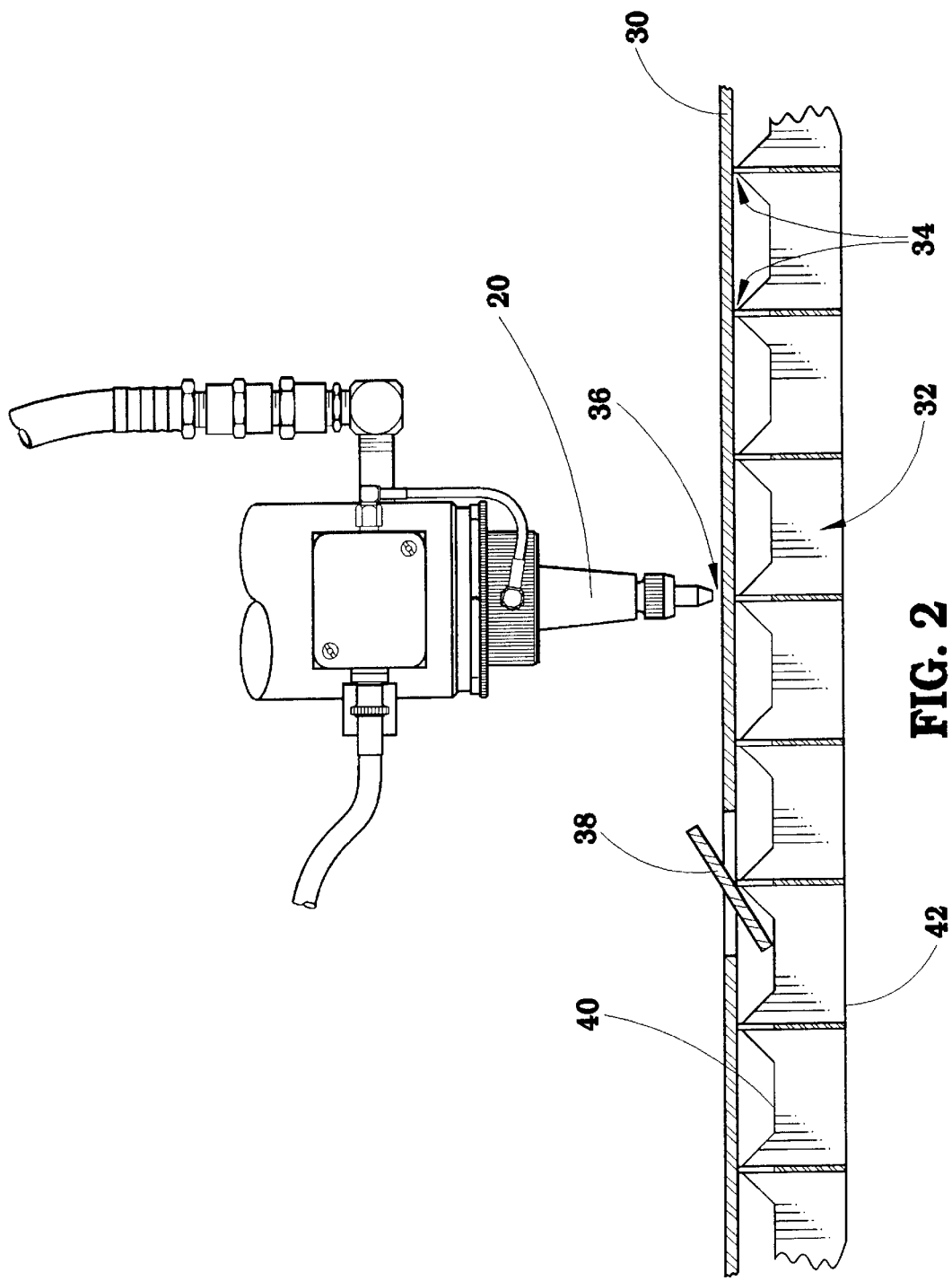
FIG. 2 is an elevational view of the laser cutting machine of FIG. 1, showing the details of the laser head, the sheet material being cut, and the supporting structure that holds the sheet in place.

As can best be viewed in FIG. 2, a small air gap 36 is automatically maintained between the tip of laser head 20 and the top surface of the sheet material 30, as related above. In a preferred embodiment, this air gap is maintained at a spacing of 0.050 inches, and uses a capacitive sensor (not shown) to detect this distance and by use of a control circuit, keep it at a constant value when in the down position. Also as best viewed in FIG. 2, when a piece of the sheet material 30 has been cut out, but fails to fall all the way to the bottom of the bed 32, it can become "hung up" on the top portion of the bed 32. This hung-up portion of the sheet material is viewed in FIG. 2, designated by the index numeral 38, and it can be seen that the top surface 40 of bed 32 "catches" the bottom portion of this cut-out piece 38 so that it cannot fall further down to the bottom of the bed (at index numeral 42). As is easy to discern from FIG. 2, if laser head 20 were to move to the left, it would ultimately interfere with the cut-out piece 38 such that there would be a collision between laser head 20 and cut-out 38. This is extremely undesirable, and to avoid such collisions in conventional laser cutting machines, laser head 20 must be commanded to first index to its "up" position before allowing itself to traverse over this cut-out area at index numeral 38. Since "up" and "down" head movements are very time consuming, it is desirable to eliminate as many as possible, and it is preferred to eliminate all such head-up/head-down movements of laser head 20.

An example part made of sheet material (and designated by the index numeral 30) is depicted in FIG. 3, after it has been cut-out by laser cutting machine 10. It will be understood that the smaller areas that have been cut out by laser head 20 will typically fall to the bottom 42 of the bed structure 32, thereby causing no interference problems with laser head 20 as it continues to move over the surface of sheet material 30. On the other hand, some of the larger areas, such as the circle designated by the index numeral 38, can quite easily become "hung up" on the top surface 40 of the bed structure 32, thereby causing a potential interference problem with laser head 20. Even larger cut-outs, such as the shape designated by the index numeral 44, are much more likely to become "hung up," and can easily cause an interference problem if the controlling computer does not keep track of such parts as potential interference hazards. In situations where the sheet material 30 is made of a relatively light gauge material (i.e., it is relatively thin), then a great deal of time can be saved by controlling the movements of the laser head 20 so that it never has to undergo a head-up/head-down operation while cutting out its required shapes. This time savings can be greater than 50% of the time required by a conventional laser cutting machine that utilizes head-up/head-down operations to make the same required cut patterns.

When viewing the sheet material part 30 on FIG. 3, it is beneficial to think of the dimensions of this part as having X- and Y-coordinates, in which the X-axis runs parallel to the longitudinal direction of part 30, and the Y-axis runs in a direction perpendicular to the X-axis. When considering each cut-out pattern on this X-Y plane, each of the cut-outs will have a minimum X-value and maximum X-value, and a minimum Y-value and maximum Y-value. For example, on FIG. 4A, the unusual cut-off shape 44 exhibits an X-minimum value, designated by the index numeral 50, an X-maximum value at 52, a Y-minimum value at 54, and a Y-maximum value at 56. These minimum and maximums values effectively create a rectangular "box" bounded by truncated line segments along lines 50, 52, 54, and 56 on FIG. 4B, which describe the smallest rectangle that cut-out 44 fits within while maintaining an orthogonal coordinate system (such as the X-Y coordinate system described above).

Once the shape of the cut-out 44 has actually been cut by laser head 20, then it is imperative that laser head 20 not pass over this same cut-out area, unless the head undergoes a head-up/head-down operation while traversing this area. One possible exception to this "rule" is where the area of the cut-out is sufficiently small (e.g., below 0.0625 square inches) so as to guarantee that there will be no interference with the laser head, and such cut-outs can essentially be ignored for purposes of interference checking.

Figure 4A:
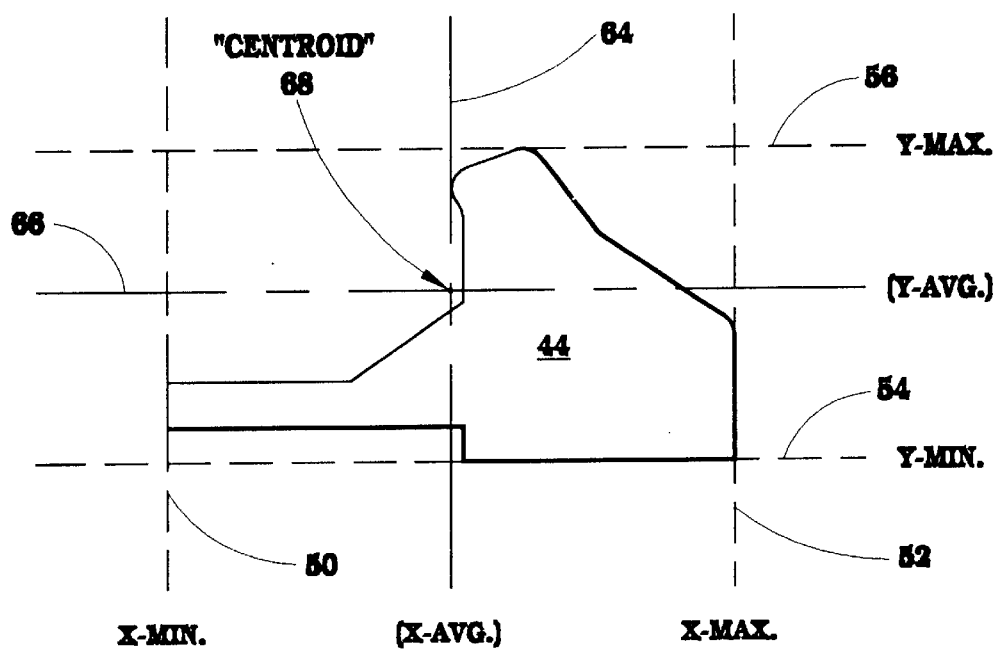
FIG. 4A is a plan view of the X-Y coordinates of one of the cut-outs depicted in the sheet material part of FIG. 3.
Figure 4B:
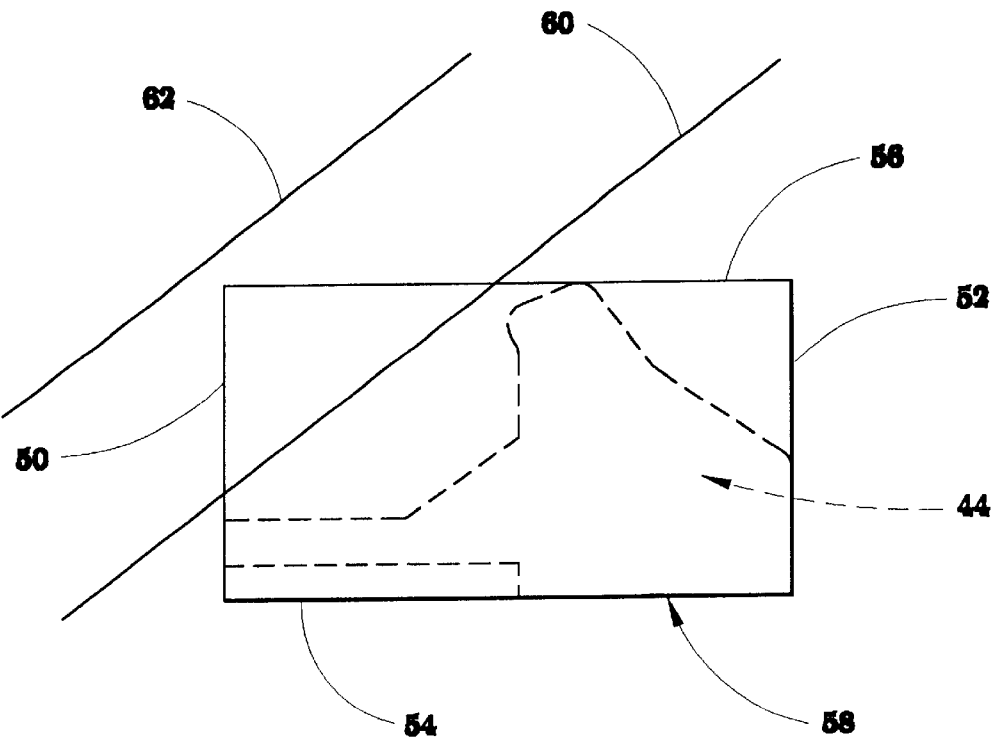
FIG. 4B is a plan view of the cut-out of FIG. 4A, emphasizing the differences between its X-Y coordinate "box" and its actual shape.

Since it is preferred to not cause laser head 20 to go through any head-up/head-down operations, it is desirable to restrict its movements to paths such as shown by the lines 60 and 62 on FIG. 4B. It will be understood that, during rapid-travel movements of laser head 20, it is quite common for both X-movement and Y-movement to occur simultaneously and at the same rate, thereby causing laser head 20 to move at 45° angles with respect to the X-Y coordinate grid system. Of course, once head 20 reaches either the next desired X-value or Y-value, when one of those values is first achieved, the laser head 20 will not move any further in that direction, but will instead continue moving in the perpendicular direction until the new location is reached having both the proper X-coordinate and Y-coordinate. In the illustrated example of FIG. 4B, it is assumed that the rapid-travel movement is occurring both axes simultaneously while making the movement near cut-out 44.

In the illustrated embodiment, for ease of calculating the cut-out areas for all shapes to be cut by laser head 20, it is assumed that the entire rectangular box 58 (made up of lines 50, 52, 54, and 56 on FIG. 4B) should be avoided by laser head 20 after the box's particular cut-out area (e.g., cut-out 44) has been performed by laser head 20. Using this assumption, a later rapid-travel path through this rectangular box 58 would not be allowable, and therefore, path 60 would be illegal under these rules. Instead, laser head 20 would have to translate further in either the X or Y direction, so as to move along path 62 to completely avoid rectangular box 58. Of course, it will be understood that the precise cut-out shape 44 could be used in determining safe laser head rapid-travel paths when making the analysis of allowable or non-allowable laser head movements, and under those rules, path 60 would be allowable as a rapid-travel pathway for laser head 20. Naturally, such precise record-keeping will increase the amount of processing time required by the computer for laser cutting machine 10, but as more powerful and faster computers are made available over time, this may easily become the preferred mode.

The cut-out 44 depicted in FIG. 4A additionally shows the "center-X" and "center-Y" positions for the rectangular box defined by the X and Y minimums and maximums. The center-X position is designated by the index numeral 64, and is equal to the sum of the X-minimum value 50 and the X-maximum value 52, divided by 2 (and numerically represents an X-average). The center-Y position, designated by the index numeral 66, is equal to the sum of the Y-minimum value 54 and the Y-maximum value 56, divided by 2 (and numerically represents a Y-average). The intersection of the center-X and center-Y positions defines a point, designated by the index numeral 68, which is known as the "centroid," and which is used in many other calculations involving the present invention.

In FIG. 5A, a circular cut-out shape designated by the index numeral 70 is depicted, and has a centroid at index numeral 72, which also happens to be the center of circle 70. A hole 74 is the desired location for the "pierce point" or "pierce location," and the point 76 is the desired "end of cut." In laser cutting applications, it is typically undesirable to start the laser burn at a position that is directly on the "important" cut-out shape, such as the circumference of circle 70 on FIG. 5A. The reason for this is that the initial burn through the sheet material 30 may blow a hole in the material that is wider than the path width of the laser beam under normal cutting movement conditions. In addition, any "dross" that may accumulate at the point the laser beam first pierces the sheet material should not be on the preferred cutting path (i.e., path 70), but preferably is to be located within a portion of the sheet material that is to be cut-out, and later discarded.

Therefore, to cut circle 70, the laser head is preferably positioned at the pierce point 74, and remains there until the laser beam has been turned on long enough to guarantee penetration through the sheet material. The laser head then will traverse from the pierce point 74 toward the desired cutting path 70, as depicted by the line 80. Once reaching the cutting path 70, the laser is then moved in a controlled circular path, so as to perform the precise cut shown by the path 70. This path depicted by the index numeral 80 is known as the "lead-in," and is found on virtually every laser cutting machine presently manufactured. In the present invention, the length of path 80 typically can be fixed at a distance according to the programmer's preference, such as a nominal distance of 0.050 inches, as designated by the letter "D" on FIG. 5A. In this manner, time is saved by not having to traverse the entire radius of the circle starting at its centroid 72, and then traversing along line segments 78 and 80.

A similar example for rectangular or square shapes is depicted in FIG. 5B, where the desired cut-out shape is designated by the index numeral 90. The centroid of this shape is located at index numeral 92, the pierce point is designated by the index numeral 94, and the end-of-cut point is designated by the index numeral 96. The lead-in path is designated by the index numeral 100, and can be set to a nominal distance of 0.050 inches (i.e., at dimension "D"). It is preferred that the lead-in direction follow along the diagonal line segment defined by line segments 98 and 100 on FIG. 5B. In actual use, the laser head would position itself at the pierce point 94 and start its burn. Once the sheet material has been penetrated, the laser head would move along line 100 until reaching the point 96, after which it would then move along the rectangular pathway 90 until again coming to the point 96, at which time the laser would turn off.

It will be understood that the lead-in angles and linear distances could be adjusted to many other values for various shapes of cut-outs without departing from the principles of the present invention. In the illustrated embodiment, it is preferred that, for circular cut-outs, the lead-in angle is always along either the X-axis or the Y-axis, which means that the lead-in angle will always be one of the following possible angular values: 0°, 90°, 180°, or 270°, with respect to the X-Y coordinate grid system. For rectangular cut-out shapes, the lead-in angle can be defined by a diagonal line segment that extends from the centroid (such as centroid 92) to one of the corners of the cut-out (such as corner 96). In the case of a "square" cut-out having its sides parallel to the X- and Y-axes, the possible lead-in angles would be as follows: 45°, 135°, 225°, or 315°. For shapes other than pure circles or rectangles, it is preferred that a rectangular box shape be assumed when calculating the angle along which the lead-in will occur, unless such lead-in angles are impossible for a particular shape. For irregular shaped cut-outs, it is preferred that the pierce point be located proximal to an intersection of line segments that make up cutting path, in which this intersection would have been chosen for the lead-in angle if the shape had been rectangular.

In an alternative embodiment, the lead-in angle for square or rectangular shapes optionally can be restricted to angles that are parallel to the X- and Y-axes (i.e., at angles of 0°, 90°, 180°, or 270°), or to locations that bisect one of the linear sides of the cutting path for these shapes. For example, on FIG. 5B a lead-in angle of 90° can be used, as depicted by the line segment 102, which represents a lead-in path that starts at a pierce point 104 and ends at a start-of-cut point 106. This alternative lead-in angle allows the corner radii to be uniform for all four corners of the cut-out without any otherwise necessary special programming to control the laser head at the point where the lead-in path joins the cutting path 90. This allows the programmer to choose locations other than a corner (or intersection) at which the inevitable "mark" (i.e., an irregularity in the cut) will appear on the cutting path or edge of the cut-out.

In conventional laser cutting systems, a two-dimensional representation of the sheet material and the proper cut-outs is created using a CAD (computer aided drafting) computer program, thereby creating a "CAD file." There are many CAD software products available, and virtually everyone of them can create standard graphics files in the format of either an "IGES" or "DXF" data file that can be used in many other CAD systems or CAD/CAM systems. As related above, the CAD file would typically use "nesting" to design several parts to be made from a single sheet of material. This CAD file is then used by a CAD/CAM computer program, which then creates an initial "NC code" file (also called a "part program") that includes a first "tool path." This file is an "intermediate" file which includes a tool path, however, it does not include every command needed to operate the laser cutter, and typically would not include such commands as head-up/head-down, start-cut, or stop-cut. The CAD/CAM computer program will add all of the necessary commands to the data file before this file is transferred to the laser cutting machine for actual execution.

Figure 6:
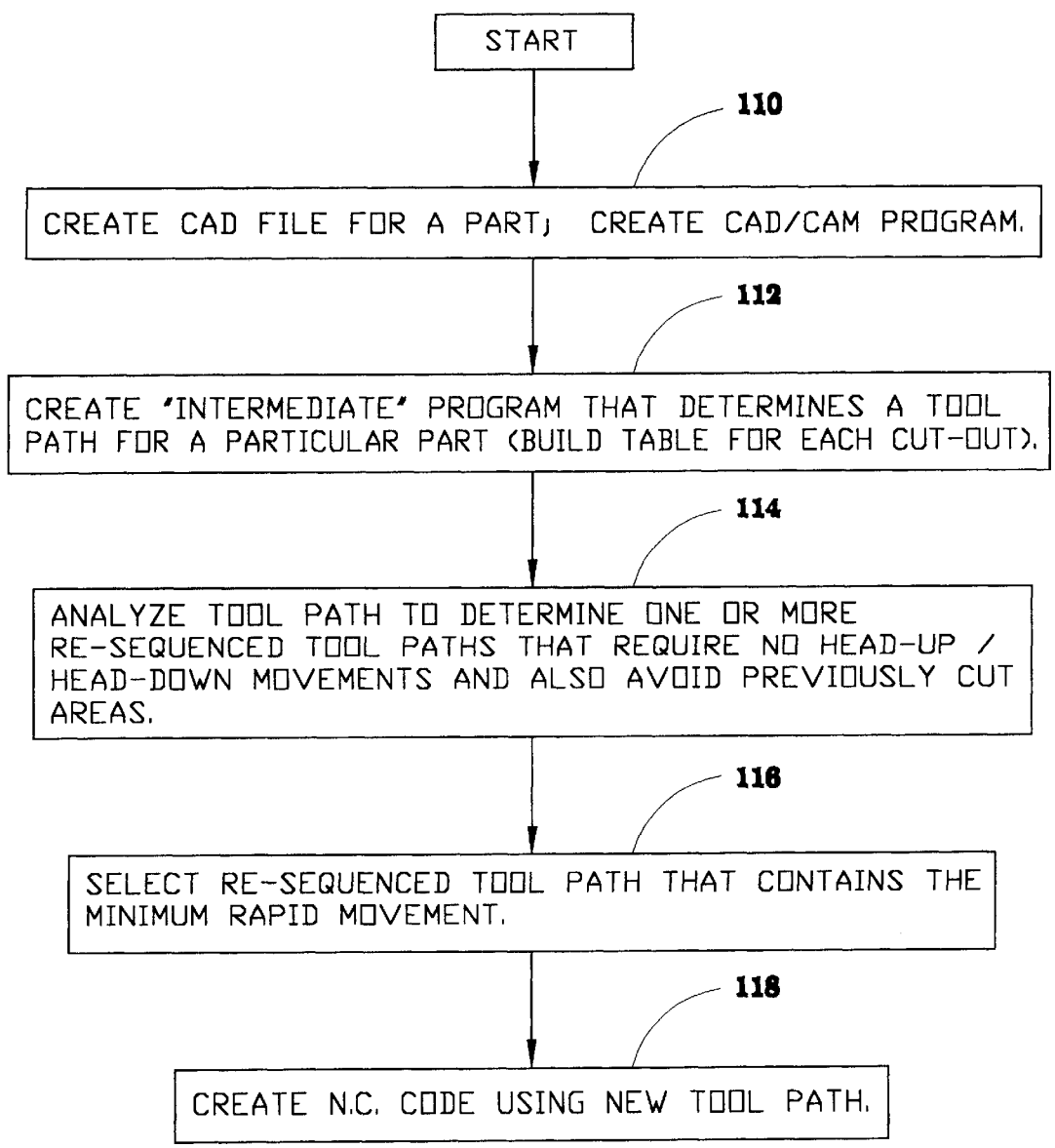
FIG. 6 is a flow chart depicting the major steps that are required in creating a "part program" of NC code having minimum rapid-travel distance for the laser head of the laser cutting machine of FIG. 1, according to the principles of the present invention.

The present invention uses some of the same steps as used by conventional CAD/CAM systems, however, the initial tool path is analyzed many times over in an attempt to find the quickest possible way to implement the cutting processes for the particular sheet material part. In FIG. 6, the major steps to create this optimized tool path are described in flow chart form, and at a function block 110 a CAD file is first created for a particular part, and an initial NC code file (i.e., the initial CAD/CAM program data file) is created.

In the next step, at a function block 112, an "intermediate" program is created that determines a tool path for this particular part. This intermediate program mainly consists of a data table for each cut-out which includes commands for the types of movements to be performed (e.g., rapid-travel movement, slower cutting movement in a straight line, a slower cutting movement in an arc, etc.), the necessary X and Y vectors, a set of values for each cut-out, including the maximum and minimum X and Y values, and many other types of information to control the actual movements of the laser head. It will be understood that such data tables typically use a specific protocol that can be understood by a specific CAD/CAM program, and also would be typically aimed at the protocol used by a specific laser cutting machine.

In the next step, at a function block 114, the tool path created by the intermediate program is analyzed multiple times, and one or more "re-sequenced" tool paths are created that will require no head-up/head-down movements while avoiding previously cut areas on the sheet material part. Function block 114 is quite complex, and is described in greater detail hereinbelow, and includes flow charts that are described on FIGS. 7A, 7B, 9C, 9D, 10C, 10D, 11C, 11D, 12B, 13B, and 14A–14E. It will be understood that, rather than use an "intermediate" program created by a particular CAD/CAM software product, the present invention easily could be used to create the initial "intermediate" program based solely upon the data contained in the original CAD-file for the part. In this situation, the tasks performed at function block 112 would be entirely derived by the present invention.

The next major step on FIG. 6 occurs at a function block 116 that selects the re-sequenced tool path that contains the minimum rapid-travel distance that the laser head must move. Once this tool path is known, the logic flow is directed to a function block 118 that creates a new part program data file containing NC code that uses the new tool path.

It will be understood that the principles of the present invention can be applied either during post-processing of the NC code, or after all post-processing has been accomplished. It is preferred that the analysis steps concerning the tool path re-sequencing occur during post-processing, which allows the methodology of the present invention to be used after an initial tool path has been created by the CAD/CAM computer program, but before every required command has been inserted into the CAD/CAM data file. In addition, the "library files" containing various geometric shapes typically would be accessible for use in creating the re-sequenced tool paths while analyzing the initial tool path. Once the optimal tool path has been found, the part program (which contains the optimal tool path) can be sent back to the CAD/CAM computer program which will then add all of the necessary commands to complete the NC code, and which will then be in a condition to be introduced directly to the laser cutting machine.

Figure 7A:
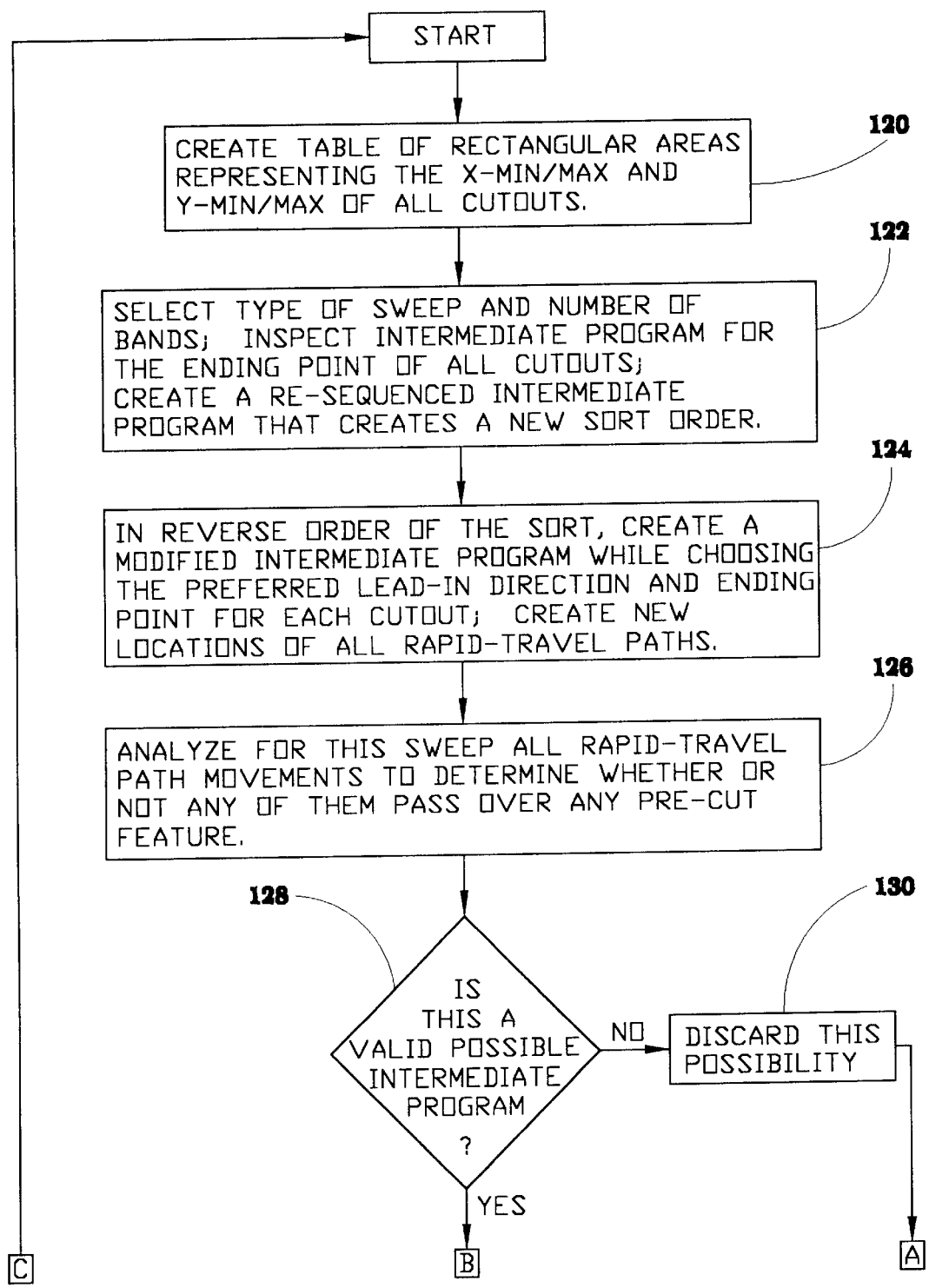
FIGS. 7A and 7B are a flow chart depicting the details of the step that analyzes tool paths on FIG. 6, thereby creating a new "intermediate program" that includes no head-up/head-down movements by the laser head.

On FIG. 7A, a data table is created that contains information concerning all of the rectangular areas (or "boxes") that represent all of the X-minimum, X-maximum, Y-minimum, and Y-maximum values for each of the cut-outs in the intermediate program, at a function block 120. In the next step, at a function block 122, the type of sweep and the number of bands are selected, and the intermediate program is inspected to find the ending point of each cut-out. A new "re-sequenced" intermediate program is created which typically would include a new sort order. As used herein, the term "sweep" represents the counting of how many cut-outs exist within a particular band, and the term "sort" is the step of determining the order in which the cut-outs would be cut within this band, and a "sort" also calculates the rapid-travel distance incurred within that band.

Figure 7B:
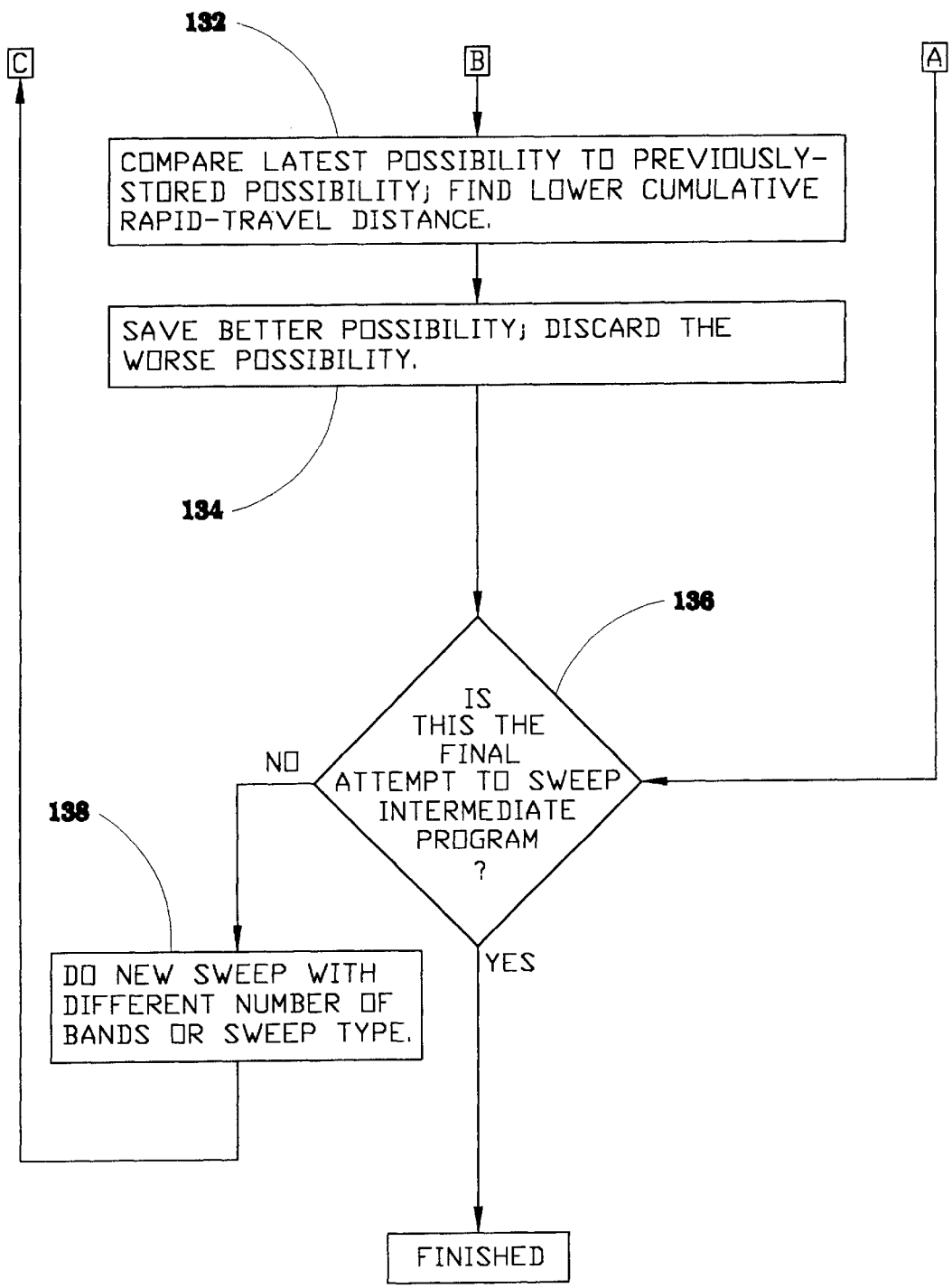

As related above, the maximum number of bands is typically in the range of twenty (20) to thirty (30) bands, and it is preferred that this number be adjustable by a human user via some type of keyboard entry device that communicates with a computer system (e.g., such as computer 15) performing these operations. Furthermore, it is preferred that all sweep types start with one (1) band, and then increase the number of bands (preferably incrementally) until reaching the maximum number of bands desired for these analysis steps. It will be understood that the purpose of the flow chart on FIGS. 7A and 7B is to determine a re-sequenced tool path that will require zero head-up/head-down movements. If a part is prohibitively complex or contains cut-out shapes that do not lend themselves well to laser head movements that can be designed to avoid previously cut areas, then a "back-up"-mode analysis will preferably be performed, which will also look to find the minimum number of head-up/head-down movements, as described on FIG. 8, below.

After creating a re-sequenced intermediate program at function block 122 on FIG. 7A, the logic flow is directed to a function block 124 that, in reverse order of the sort, creates a modified intermediate program while choosing a preferred lead-in direction and ending point for each cut-out. Furthermore, new locations of all rapid-travel paths will be created. In the next step, at a function block 126, the rapid-travel path movements for this sweep are analyzed to determine whether or not any of these paths will pass over any pre-cut feature. At a decision block 128, the decision is made whether or not this particular intermediate program is valid, i.e., contains no rapid-travel path movements that pass over any pre-cut feature. If the answer to this question is NO, then the logic flow is directed to a function block 130 which discards this possibility. In that event, the logic flow is directed to a letter "A", which takes the logic flow over to FIG. 7B, and arrives at a decision block 136 that determines whether or not this is the final attempt to sweep the intermediate program.

If the answer at decision block 128 was YES, the logic flow is directed to a letter "B", which directs the logic flow to a function block 132 on FIG. 7B. At function block 132, the most recent valid possibility is compared to a previously-stored valid possibility. In this comparison, the lower cumulative rapid-travel distance is sought. At a function block 134, the better possibility is saved, and the worse possibility is discarded. It will be understood that the better possibility typically is the one containing the lower amount of rapid-travel distance.

The logic flow now arrives at decision block 136, and if the most recent possibility was the final attempt to sweep the intermediate program, then the logic flow passes out the YES answer and this series of operations has been completed. If the answer was NO at decision block 136, the logic flow is directed to a function block 138 that requires a new sweep with a different number of bands or sweep type to be performed. The logic flow then is directed to a letter "C", which brings the logic flow back to the starting point at the top of FIG. 7A. The details of the types of sweeps, number of bands, creating a new sort order, and creating preferred lead-in directions for each cut-out are all described in greater detail hereinbelow.

If the flow chart of FIGS. 7A and 7B fails to find a zero interference condition, then as an optional feature, the present invention can re-perform all of the sweeps while allowing for at least one head-up/head-down operation by the laser head. This is not preferred; however, it may be necessary in some circumstances. On FIG. 8, a function block 140 is the beginning point for this optional re-analysis of the part to be cut. At a function block 142, the type of sweep and number of bands is selected, the intermediate program is inspected to find the ending point of all cut-outs, and a re-sequence intermediate program is created. At a function block 144, a modified intermediate program is created while choosing the preferred ending point for each cut-out. New locations of all rapid-travel paths are also created. The next step, at a function block 146, is to analyze all rapid-travel path movements to determine how many interference events occur where the laser head must pass over a pre-cut feature.

At a function block 148, the latest possibility (P1) is compared to the previously-stored possibility (P2). The lower number of interference events is found, and also the amount of cumulative rapid-travel distance is found for both possibilities.

At a function block 150, the better possibility is saved, and the worse possibility is discarded. In the actual event, it is likely that the lower number of interference events will control which is the better possibility, however, if the possibility that contains the lower number of interferences also contains a much greater rapid-travel cumulative distance, then it is preferred that the time required to perform the head-up/head-down movements is compared to the time required to perform the additional rapid-travel movements.

Figure 8:
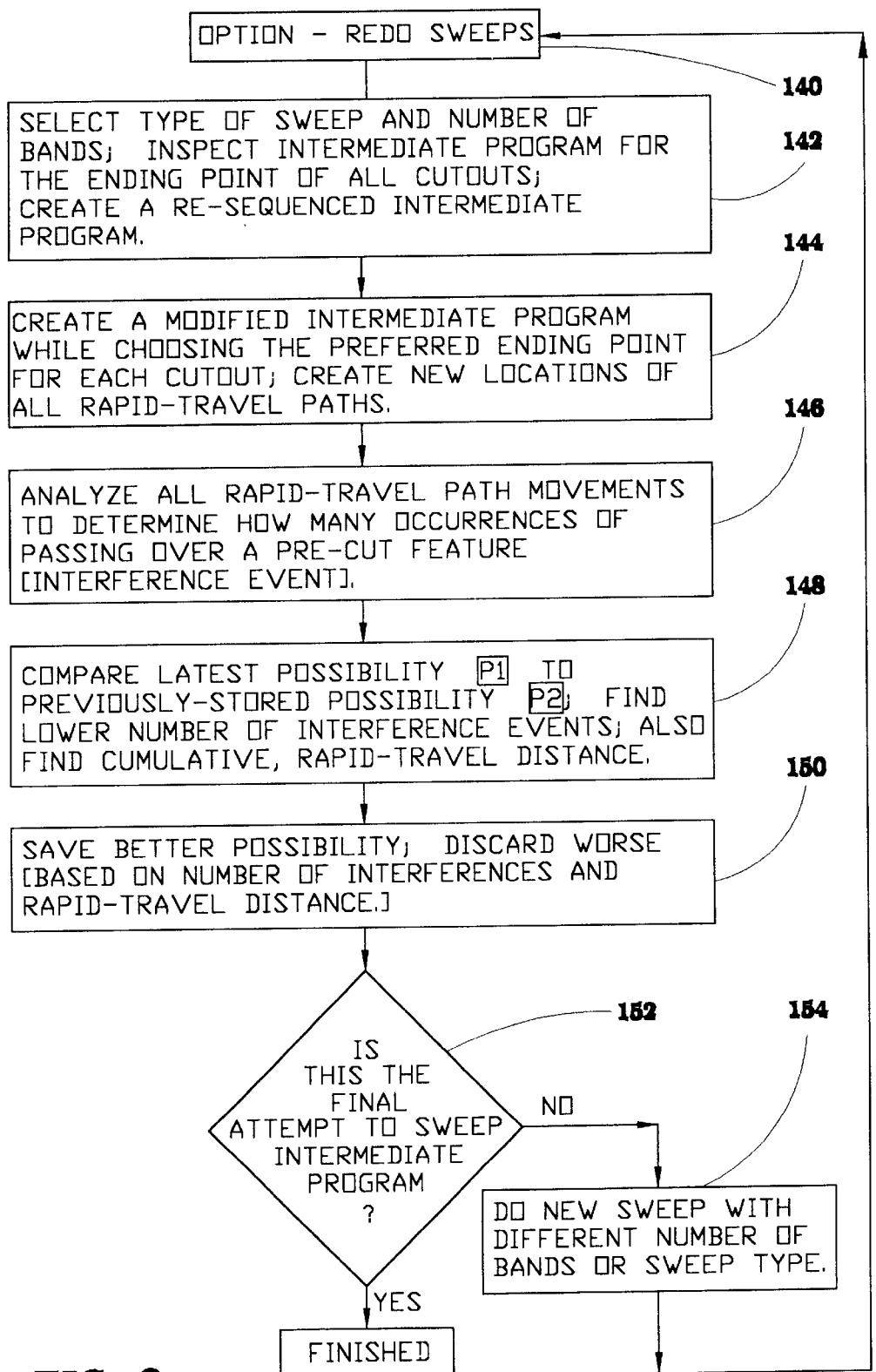
FIG. 8 is a flow chart depicting an optional series of logical operations used in creating a new "intermediate program" in which at least one interference event requiring a head-up/head-down laser head movement is allowed to remain in the intermediate program.

The logic flow now arrives at a decision block 152 which determines whether or not this was the final attempt to sweep the intermediate program. If the answer is YES, then the flow chart on FIG. 8 is completed. If the answer was NO, then the logic flow is directed to a function block 154 that causes a new sweep to be performed using a different number of bands or a different sweep type. The logic flow is then directed back to function block 140.

Figure 9A:
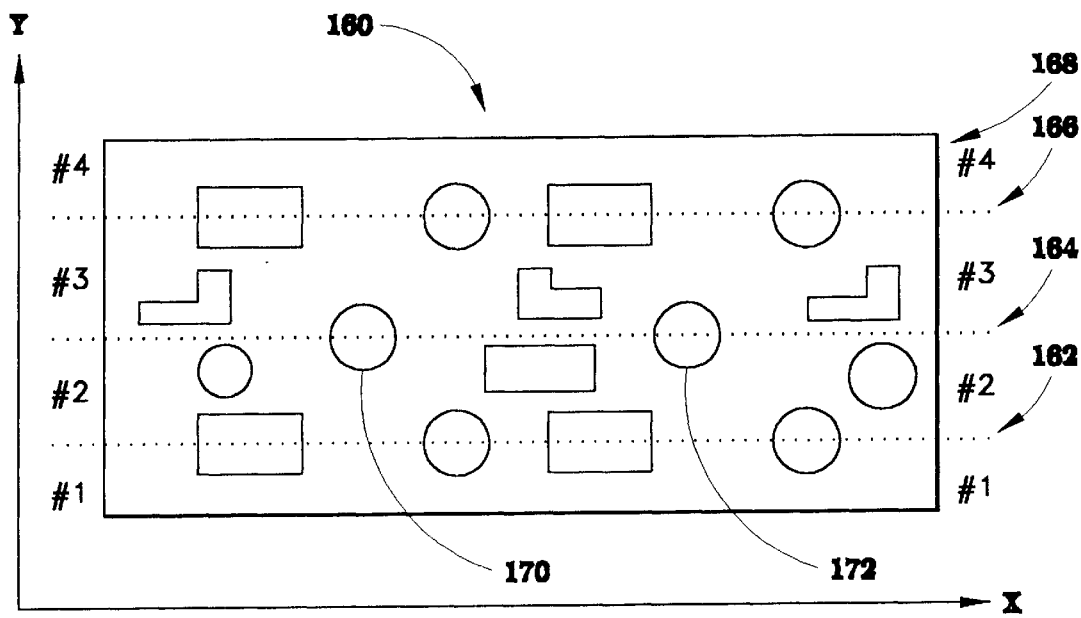
FIG. 9A depicts a graphical system using X-Y coordinates of a sheet material to be cut by a laser cutting machine in which the "sweep type" is an X-sweep, showing four (4) bands.

FIG. 9A shows a representative part to be cut, designated by the index numeral 160, in which the dotted lines represent the boundary of bands used during an X-sweep. As related above, the number of bands initially starts at one (1), however, in the illustrated example of FIG. 9A, there are four (4) bands. Since the sweep will be in the X-axis, the longitudinal dimension of each band will also be parallel to the X-axis. The bands preferably are chosen to have equal width, and band #1 extends from the bottom of the part (as viewed on FIG. 9A) to the dotted line 162, band #2 extends between lines 162 and 164, band #3 extends between lines 164 and 166, and band #4 extends between lines 166 and 168. As related above, the sweep merely counts how many cut-outs are within each band, and this is done by locating a reference point (which could be either the start-of-point or the centroid) of each of the cut-outs, as determined by the reference point's X- and Y-coordinates.

As can be seen in FIG. 9A, many of the cut-outs extend into more than one band, however, the reference point of each cut-out will exist within only one of these bands. For example, the circular cut-outs 170 and 172 both appear to have reference points that are directly on the borderline 164 between bands #2 and #3. This is easily handled merely by choosing a particular convention as to which Y-dimensions are within each particular band. It is preferred that band #1, for example, include all Y-values greater than or equal to zero and less than the value $Y_1$, in which $Y_1$ is equal to the value at line 162. Using this convention, band #2 would include all Y-values greater than or equal to $Y_1$ and less than $Y_2$, which is at line 164. Band #3, correspondingly, would include all Y-values greater than or equal to $Y_2$, and less than $Y_3$ (at line 166). Band #4 would correspondingly include all Y-values greater than or equal to $Y_3$, and less than $Y_4$, which is the top edge of the part at line 168. Using this convention, if the reference points for circles 170 and 172 have a Y-value equal to $Y_2$ (at line 164), then those circles would be counted as members of band #3, and not band #2.

Figure 9B:
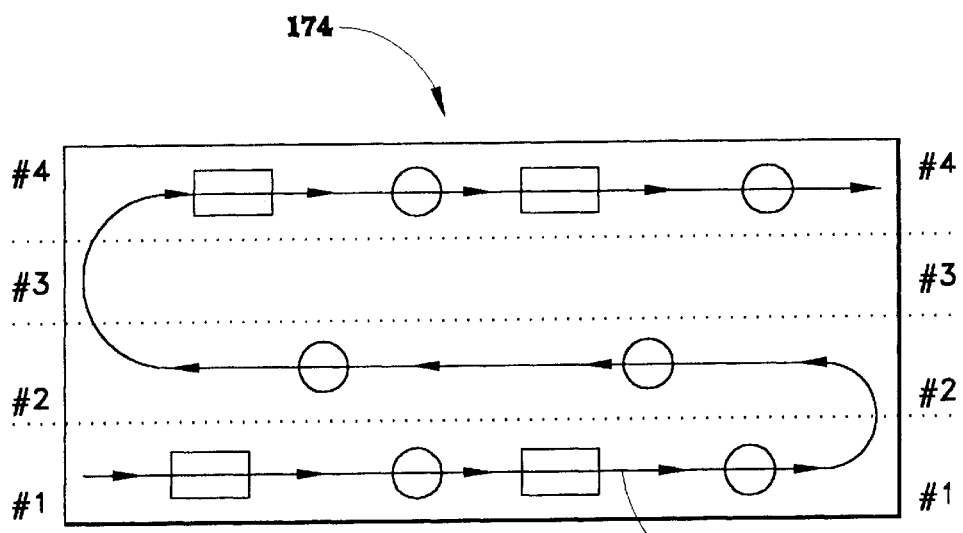
FIG. 9B shows the direction of sweeping of a part being analyzed with an X-sweep using four (4) bands.

In FIG. 9B, a similar part 174 is depicted, and again four bands for an X-sweep are illustrated. As will be described below, the X-sweep for band #1 is set to a default value of the "X-plus" direction, meaning that the sweep of band #1 starts at its minimum X-value, and moves along band #1 toward its maximum X-value. Accordingly, the direction of the sweep, as represented by the line with arrows 176, moves from left-to-right on FIG. 9B within band #1. The sweep then finishes band #1, then moves to band #2 to sweep in the X-minus direction until finishing at the X-minimum value for band #2. The sweep then continues at band #4 for the last X-direction sweep, in the X-plus direction. Band #3 was skipped during this sweep because there were no cut-outs within that band.

Figure 9C:
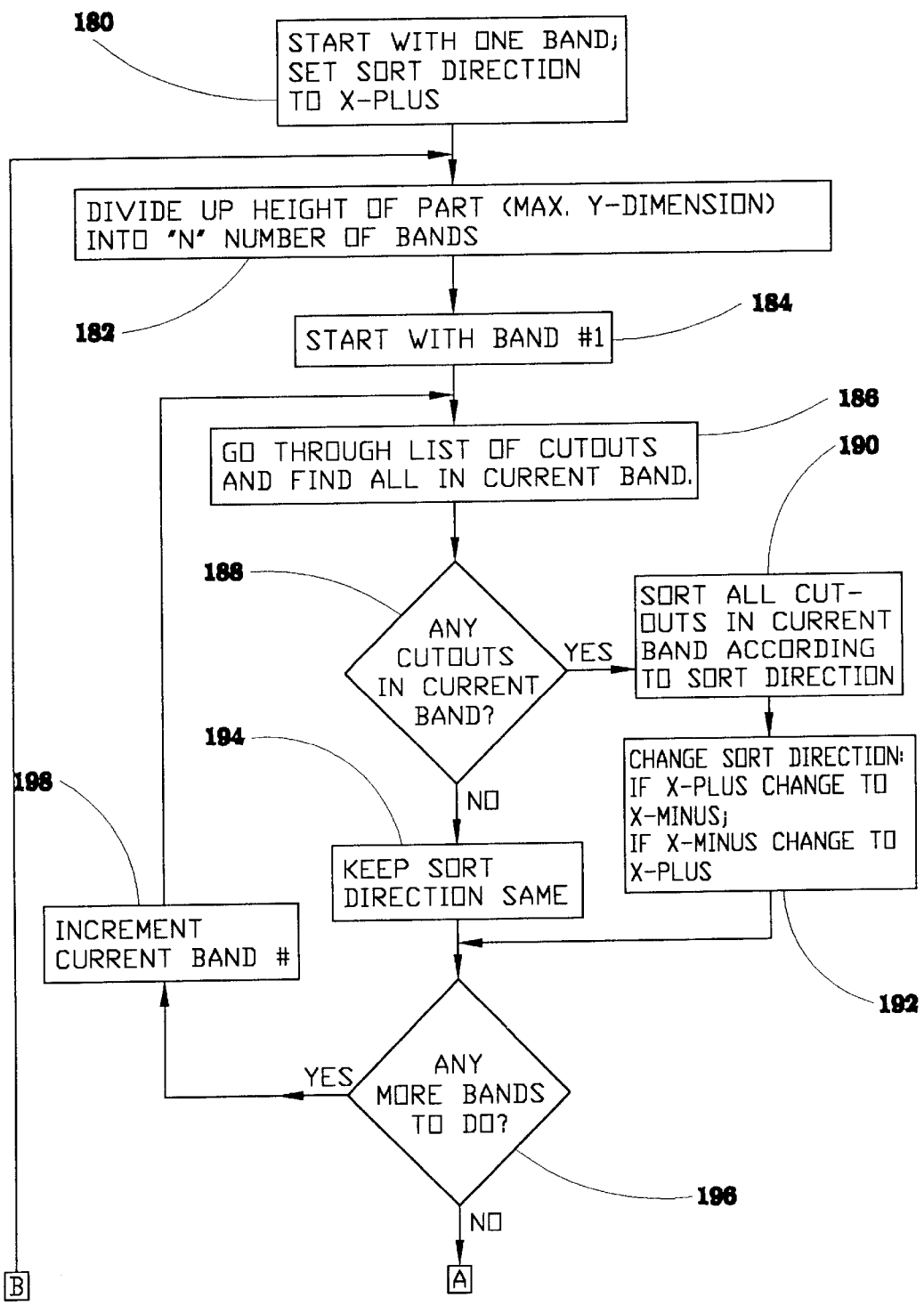
FIGS. 9C and 9D are a flow chart showing the logical operational steps required to perform an X-sweep as part of the analysis of the tool path depicted in FIG. 6.
Figure 9D:
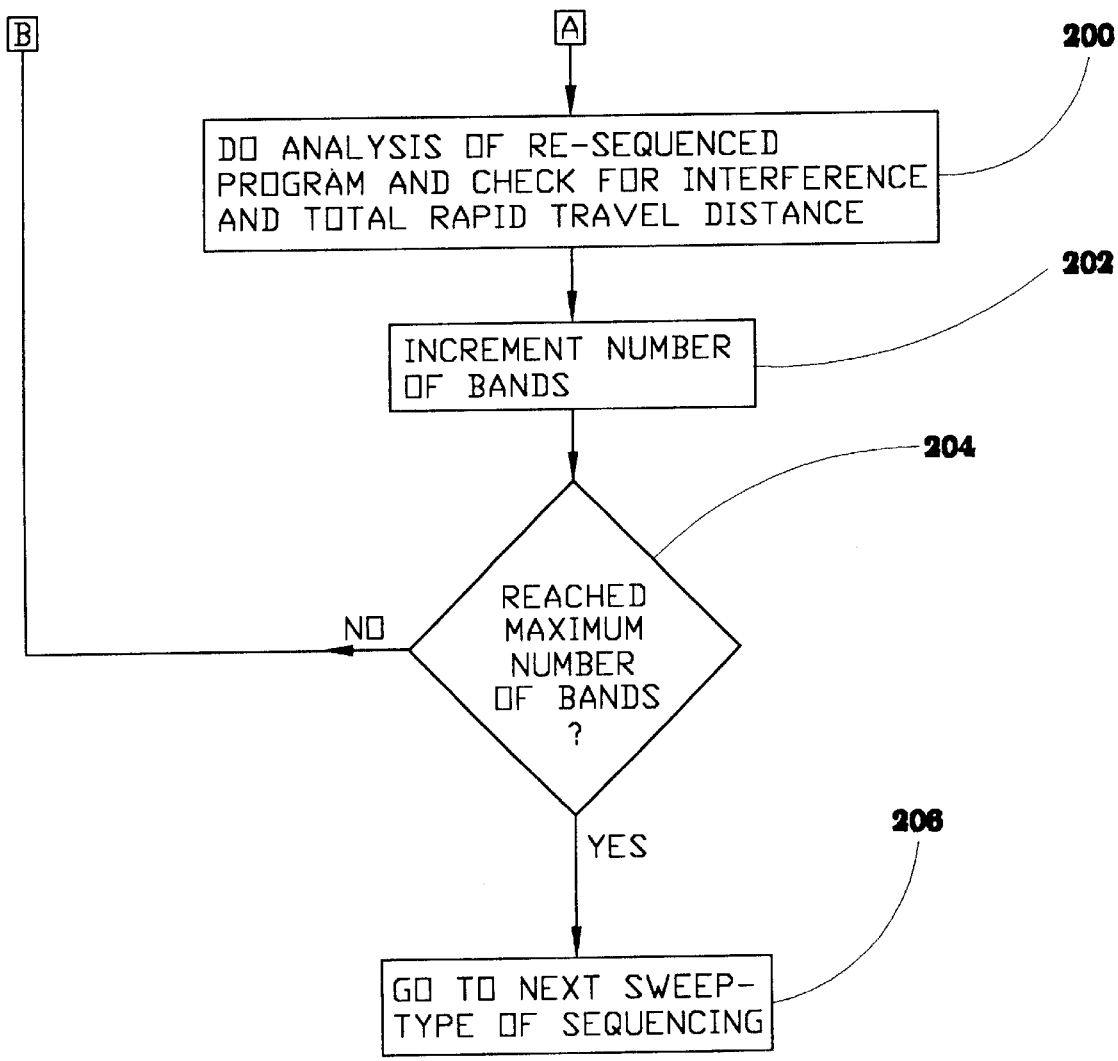

FIGS. 9C and 9D represent a flow chart that describes the methodology for performing an X-sweep. The flow chart starts at a function block 180 in which the number of bands is set equal to one (1), and the sort direction is set to X-plus. It will be understood that a data table containing information regarding each cut-out of the part has already been created, and that the original CAD/CAM data file has already produced a sort order of these cut-outs. While each sweep is performed according to the principles of the present invention, the rapid-travel distance is determined and stored, the sort order is determined (typically re-sequenced) and stored, and this all occurs for each sweep type and for each number of bands in that type of sweep. Although the data tables for each cut-out include a lead-in that was previously assigned by the conventional CAD/CAM data file (part program), the present invention temporarily eliminates the lead-in coordinate because a new lead-in location typically will be chosen for each of the cut-outs. It will be understood that conventional CAD/CAM computer programs generally choose the same direction for all lead-ins for all cut-outs on the entire part (see FIG. 15), whereas the present invention will choose lead-ins having multiple directions when considering all of the cut-outs on the entire part (see FIG. 16), and this will be discussed in greater detail hereinbelow.

At a function block 182 on FIG. 9C, the part is divided into "N" number of bands, by taking the minimum and maximum Y-dimensions and dividing the part up into equal segments along the Y-axis. Of course, during the first sweep, the value for N is set equal to one (1), however, for later sweeps the value for N will be greater than one (1). Accordingly, at a function block 184, the band number is set equal to one (1).

At a function block 186, the list of cut-outs in the data table is inspected, and all cut-outs in the current band are found. At a decision block 188, it is determined whether or not there were any cut-outs in the current band. If the answer is YES, the logic flow is directed to a function block 190 that "sorts" all of the cut-outs in the current band according to the sort direction (i.e., either X-plus or X-minus). After this has occurred, a function block 192 changes the sort direction, and the logic flow proceeds to a decision block 196 which determines whether or not there are any more bands to be sorted.

If the answer at decision block 188 was NO, the logic flow travels to a function block 194 that instructs the system to not change the sort direction. The logic flow again arrives at decision block 196 to determine whether or not there are any more bands to be analyzed. If the answer is YES, the logic flow is directed to a function block 198 in which the current band number is incremented. The logic flow then is directed back to function block 186 to analyze the list of cut-outs in the (new) current band.

If the answer at decision block 196 was NO, the logic flow is directed to a letter "A" which takes the logic flow to a function block 200 on FIG. 9D. At function block 200, the re-sequenced program is analyzed (using the new sort order of cut-outs after all bands have been swept for the entire part). In addition, function block 200 checks for any interference problems and calculates the total rapid-travel distance. After this has been accomplished, the logic flow travels to a function block 202 to increment the number of bands. For example, if the number of bands previously was set to four (4), then the number of bands is incremented to the value of five (5).

The logic flow now travels to a decision block 204 that determines whether or not the maximum number of bands has been reached. This is a value that is pre-determined by a human user, and would typically be in the range of twenty (20) to thirty (30) bands. If, for example, the maximum number of bands had been previously set to a value of twenty-five (25), and a sweep having four (4) bands has just been completed, which was incremented to the value of five (5) at function block 202, then the maximum number of bands would not have yet been reached. Under this circumstance, the logic flow leaves the NO output from decision block 204 and is directed to the letter "B", which further directs the logic flow back to FIG. 9C and to function block 182. Alternatively, if the maximum number of bands had been reached, then the logic flow is directed out the YES output of decision block 204 and arrives at a function block 206, which instructs the system to go to the next type of sweeping for re-sequencing. For example, at the end of the X-sweep, the next type of sweeping would likely be a Y-sweep.

Figure 10A:
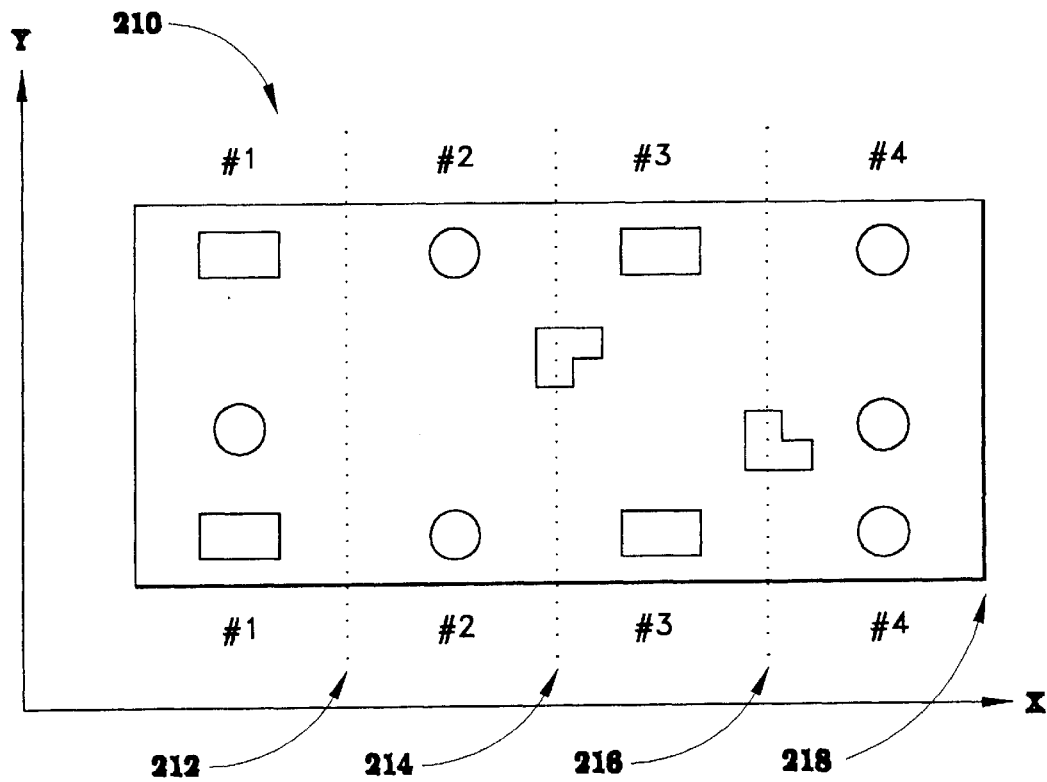
FIG. 10A depicts a graphical system using X-Y coordinates of a sheet material to be cut by a laser cutting machine in which the "sweep type" is an Y-sweep, showing four (4) bands.

FIG. 10A shows a part depicted by the index numeral 210 that has been divided up into four (4) bands for a Y-sweep. Band #1 extends from the left-hand edge (as viewed in FIG. 10A) to the dotted line 212, band #2 extends from line 212 to line 214, band #3 extends from line 214 to line 216, and band #4 extends from line 216 to the right-hand edge of the party, at 218. If the reference point of one of the cut-outs happens to be located right on one of the boundary lines, then it must be assigned to only one of the two bands that border this line. It is preferred that band #1 include X-values greater than or equal to zero, and less than a value $X_1$ at line 212. Correspondingly, using this convention, band #2 should include reference points located greater than or equal to $X_1$ and less than $X_2$ (at line 214), etc.

Figure 10B:
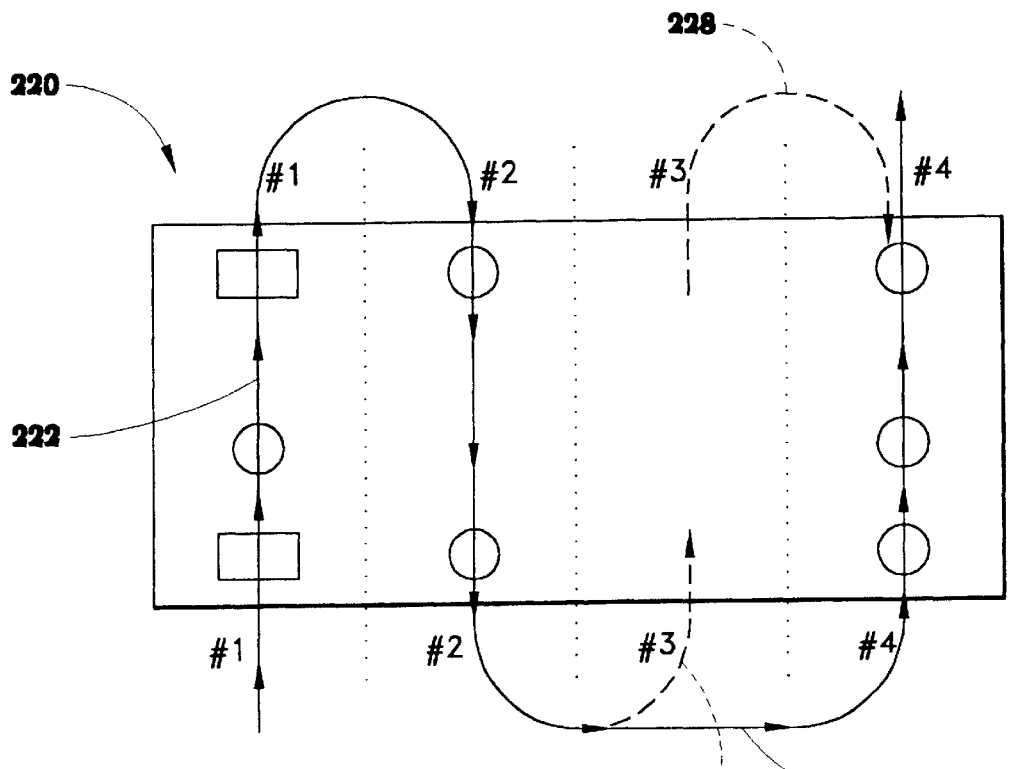
FIG. 10B shows the direction of sweeping of a part being analyzed with an Y-sweep using four (4) bands.

While performing a sweep, it is preferred to set the sweep direction in band #1 to the Y-plus direction, as is indicated by the line 222 on FIG. 10B for the first band of part at index numeral 220. Since the sweep direction is Y-plus in band #1, the sweep direction in band #2 would be Y-minus, and the sweep direction in the next band that contained any cut-outs would be in the Y-plus direction. If band #3 had no cut-outs, as shown in FIG. 10B, then there would be no sweep performed in band #3, and the sweep path would travel from band #2, then along line 224 all the way to band #4. If, on the other hand, there were at least one cut-out within band #3, then the sweep direction would follow the dashed line 226 to band #3, and then would follow the other dashed line 228 to band #4, at which time a Y-minus sweep would take place.

Figure 10C:
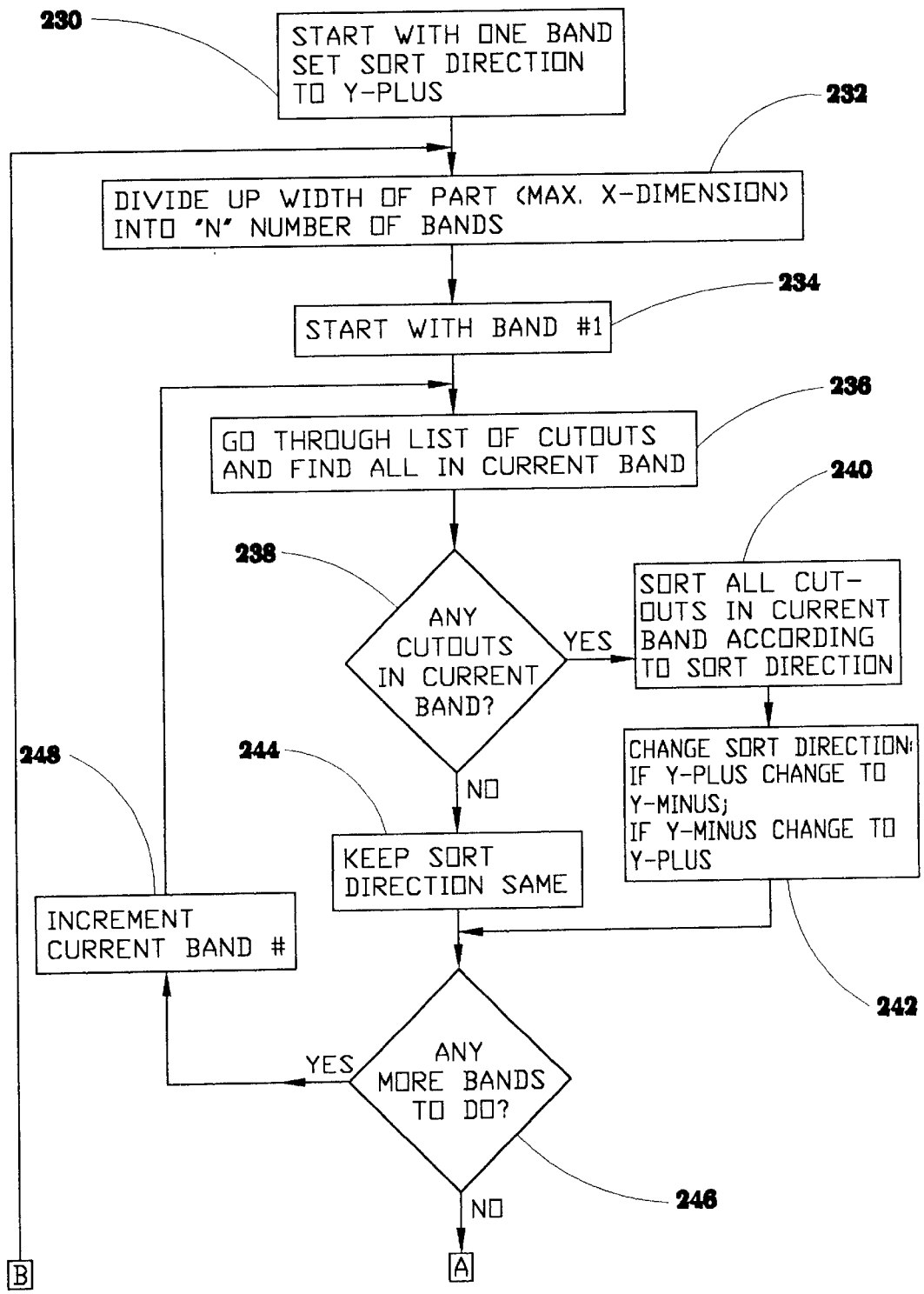
FIGS. 10C and 10D are a flow chart showing the logical operational steps required to perform an Y-sweep as part of the analysis of the tool path depicted in FIG. 6.
Figure 10D:
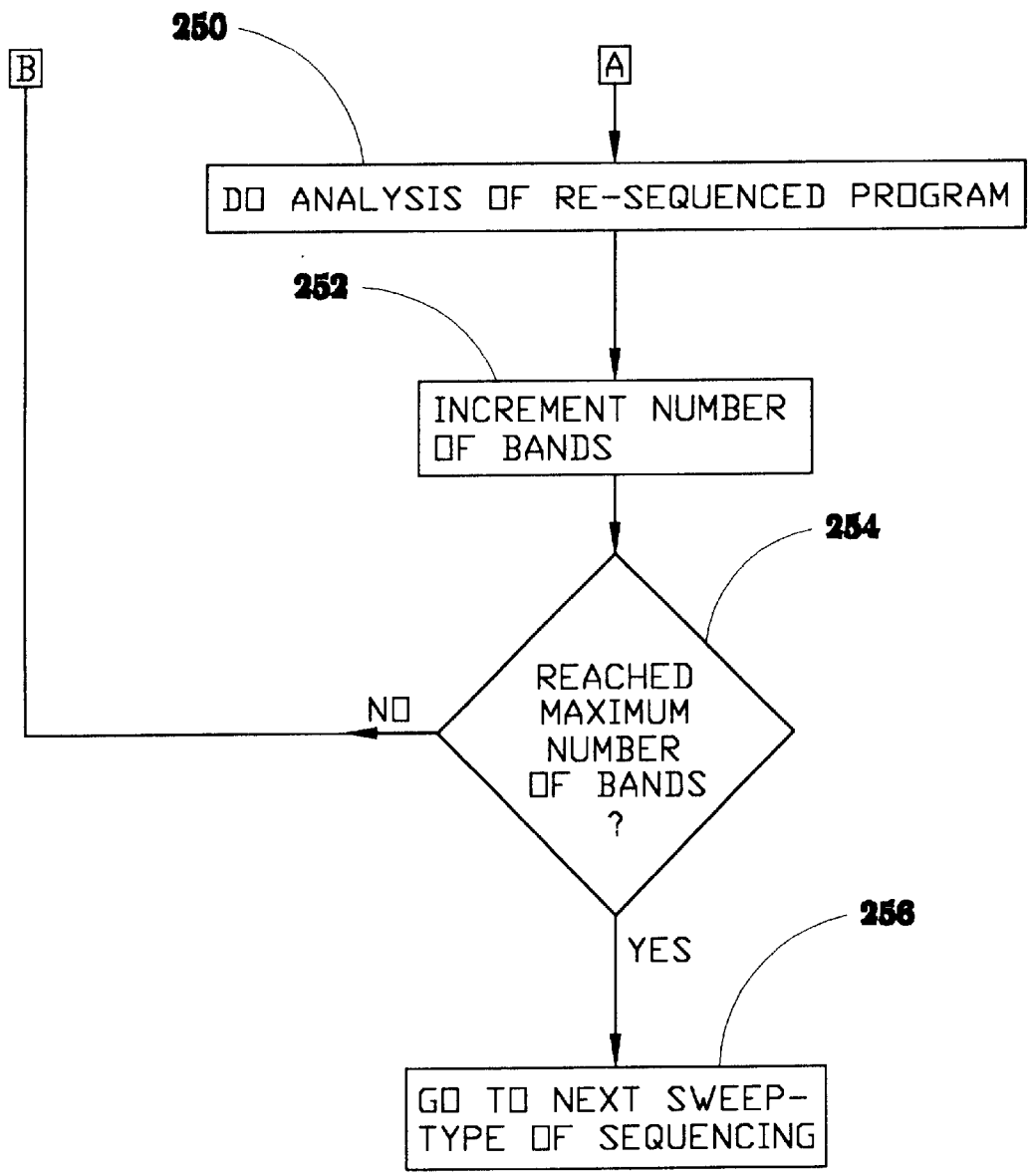

At a function block 230 on FIG. 10C, the Y-sweep begins by starting with a single band and the sort direction set to Y-plus. At a function block 232, the width of the part is divided into "N" number of bands, although for the first pass, there of course is only one (1) band. At a function block 234, for the first sweep regardless of the value of N, the Y-sweep also starts with band #1. At a function block 236, the data table of cut-outs is inspected to find all having reference points within the current band.

At a decision block 238, it is determined whether or not any cut-outs exist within the current band. If the answer is YES, a function block 240 sorts all of these cut-outs in the current band according to the sort direction (as exemplified by the directional lines in FIG. 10B). At a function block 242, the sort direction is changed, and the logic flow is then directed to a decision block 246 that determines whether or not there are any more bands to do in this particular sweep.

If the answer at decision block 238 was NO, the logic flow is directed to a function block 244 that prevents the sort direction from being changed. The logic flow then arrives at decision block 246 to discover whether or not there are more bands to do. If the answer is YES, the logic flow is directed to a function block 248, which increments the current band number, and then directs the logic flow back to function block 236. If the answer at decision block 246 is NO, the logic flow is directed to a letter "A" that then directs the logic flow to a function block 250 on FIG. 10D.

At function block 250, an analysis of the re-sequenced program is performed, while checking for any interference problems and calculating the total rapid-travel distance. The next step is to increment the number of bands, at a function block 252. A decision block 254 then determines whether or not the maximum number of bands has been reached, which was previously set by the human user (or was set by a default value), to a number such as twenty-five (25). If the answer is NO, the logic flow is directed to a letter "B" which takes the logic flow back to function block 232 on FIG. 10C. If the answer is YES, then the logic flow is directed to a function block 256 that directs the program to the next "sweep-type" of sequencing.

Figure 11A:
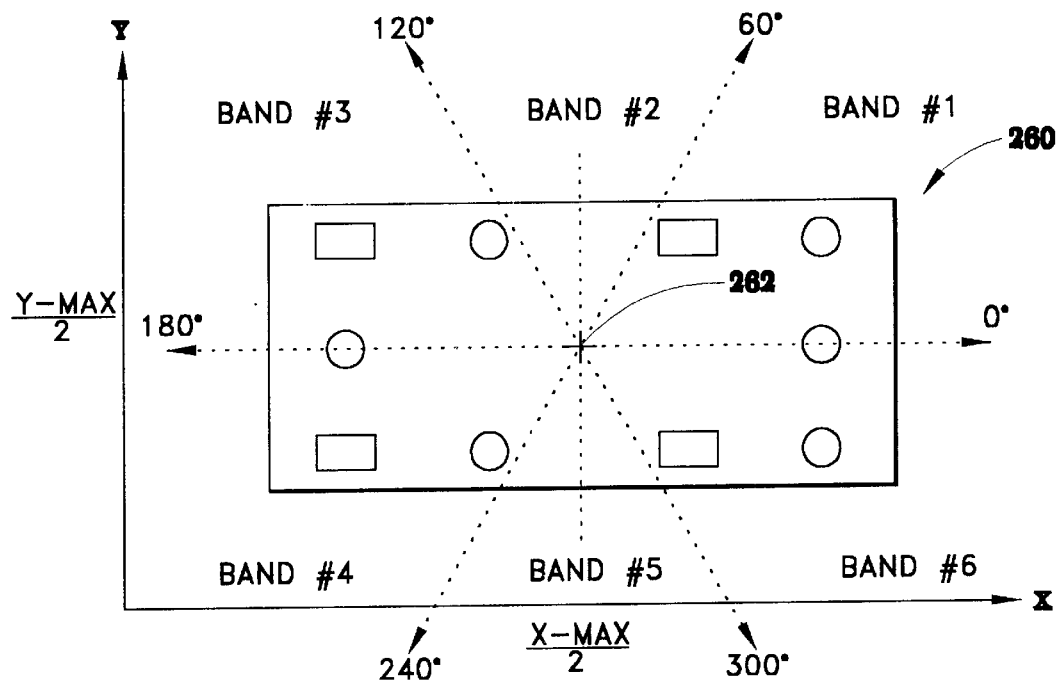
FIG. 11A depicts a graphical system using X-Y coordinates of a sheet material to be cut by a laser cutting machine in which the "sweep type" is a Radial Pie sweep, showing six (6) bands.

FIG. 11A depicts a part designated by the index numeral 260 which is to be re-sequenced using a Radial Pie sweep. Band #1 consists of the "pie slice" between 0° and 60°. Similarly, band #2 comprises the pie slice between 60° and 120°, band #3 comprises the pie slice between 120° and 180°, band #4 comprises the pie slice between 180° and 240°, band #5 comprises the pie slice between 240° and 300°, and band #6 comprises the pie slice between 300° and 0°. The origin for the X-Y axes preferably is set at the centroid of the entire part 260, at the location designated by the index numeral 262. As in the case of X-sweeps and Y-sweeps, a convention must be chosen in situations where the reference point of a cut-out is located directly on one of the boundaries between bands. For example, band #1 preferably includes all angles greater than or equal to 0° and less than 60°. Using this same convention, band #2 would include all angles greater than or equal to 60° and less than 120°.

Figure 11B:
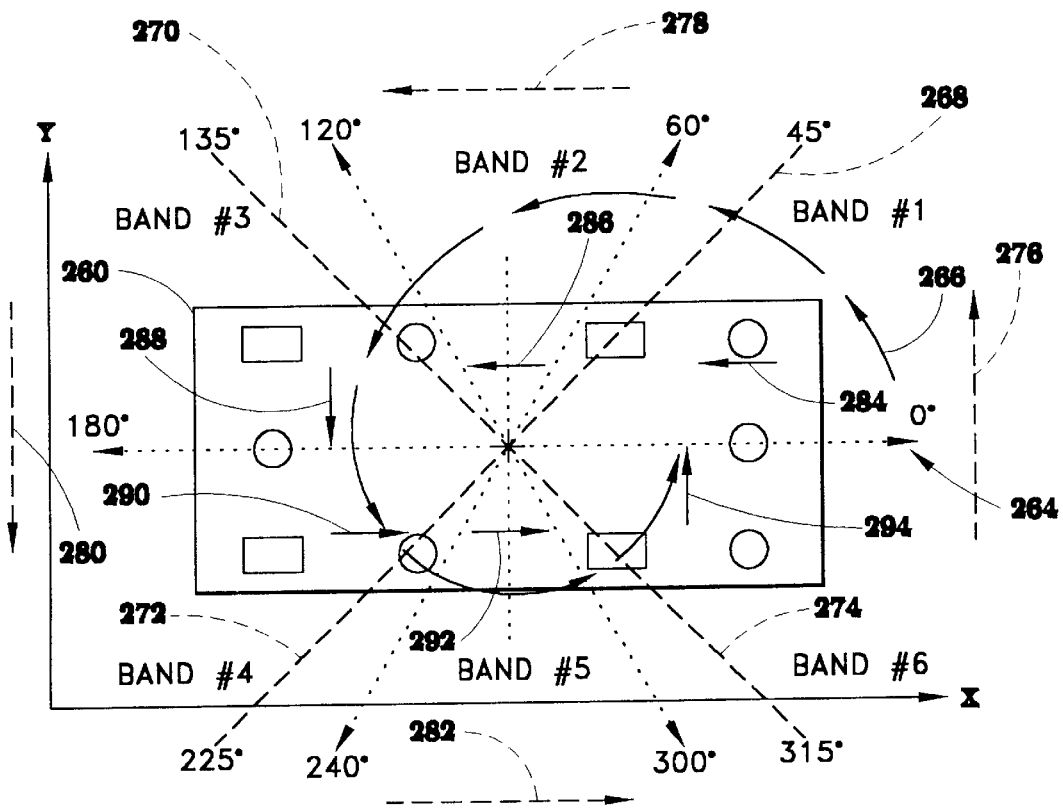
FIG. 11B shows the direction of sweeping of a part being analyzed with a Radial Pie sweep using six (6) bands.

In FIG. 11B, the sweep directions for part 260 are depicted. In general, the sweep direction is from the 0° axis (at index numeral 264) and moves in a positive angular direction (i.e., counterclockwise) throughout a 360° angle, until arriving back at the 0° axis 264. The spiral shaped set of arrows, designated by the index numeral 266, generally shows the order in which the bands are swept. In the example depicted on FIGS. 11A and 11B, there are six bands (each being 60° in arc length), however, the number of bands can range from one (1) through twenty (20) or thirty (30), depending upon the value entered by the human user as to the maximum number of bands for the Radial Pie sweep type.

Regardless of the number of bands used for a particular Radial Pie sweep, the sort direction depends upon the location of the "end-angle" for each band with respect to angles that are 45° from either the 0° axis or the 180° axis. In other words, angle boundaries at 45° (see dashed line 268), 135° (see dashed line 270), 225° (see dashed line 272), and 315° (see dashed line 274) control the direction that sorting takes place regardless of the number of bands used. This is described in greater detail in the flow chart in FIGS. 11C and 11D, however, it can be briefly explained as using a Y-plus sort (see dashed line 276) for band end-angles that fall between the angular values 315° and 45°, an X-minus sort (see dashed line 278) between the angular values 45° and 135°, a Y-minus sort (see arrow 280) for band end-angle values between 135° and 225°, and an X-plus sort (see arrow 282) for band end-angle values between 225° and 315°.

Based upon these parameters, the sort direction for band #1 would be X-minus (see arrow 284), the sort direction for band #2 would also be X-minus (see arrow 286), the sort direction for band #3 would be Y-minus (see arrow 288), the sort direction for band #4 would be X-plus (see arrow 290), the sort direction for band #5 would also be X-plus (see arrow 292), and the sort direction for band #6 would be Y-plus (see arrow 294).

Figure 11C:
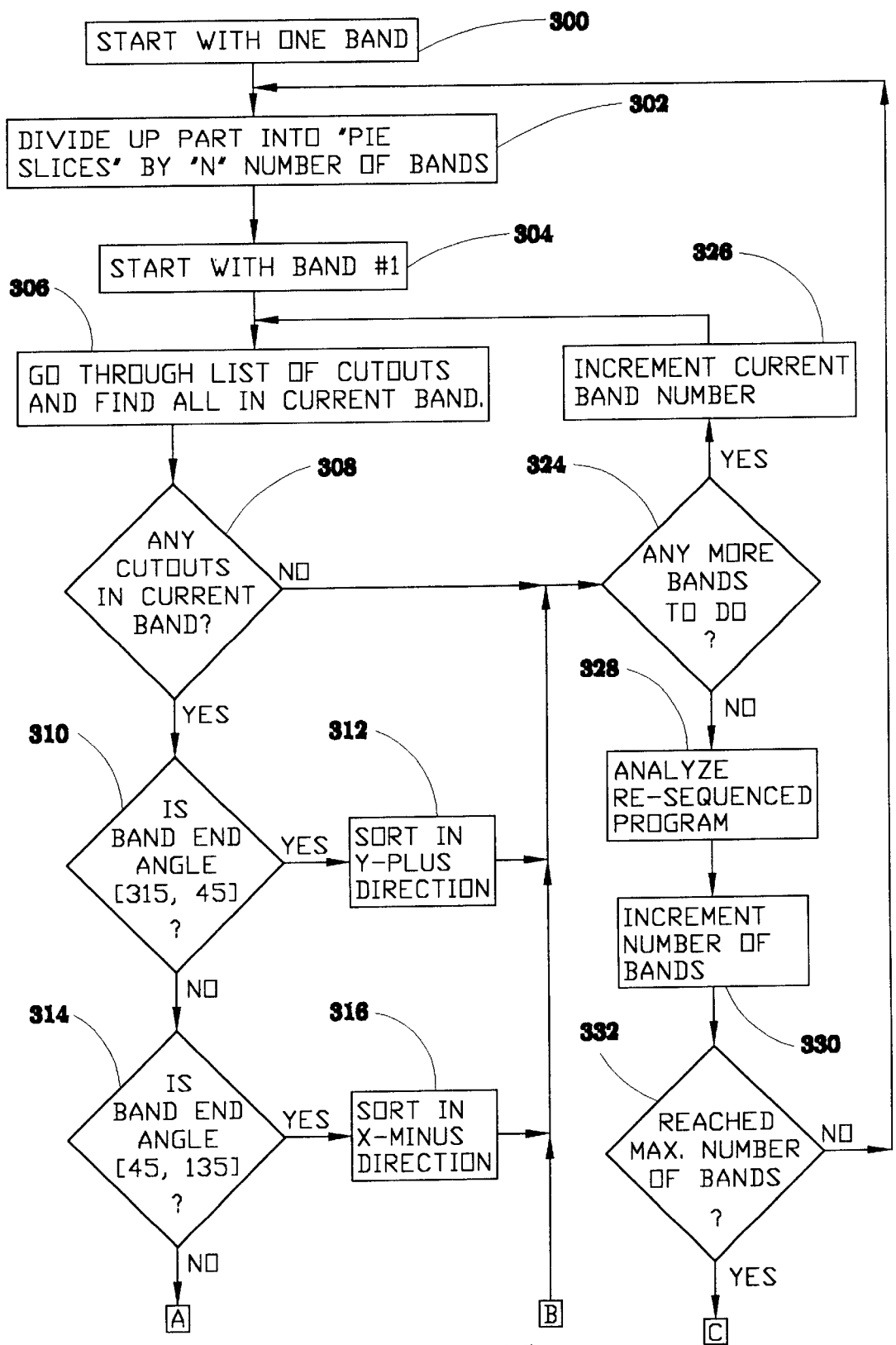
FIGS. 11C and 11D are a flow chart showing the logical operational steps required to perform a Radial Pie sweep as part of the analysis of the tool path depicted in FIG. 6.
Figure 11D:
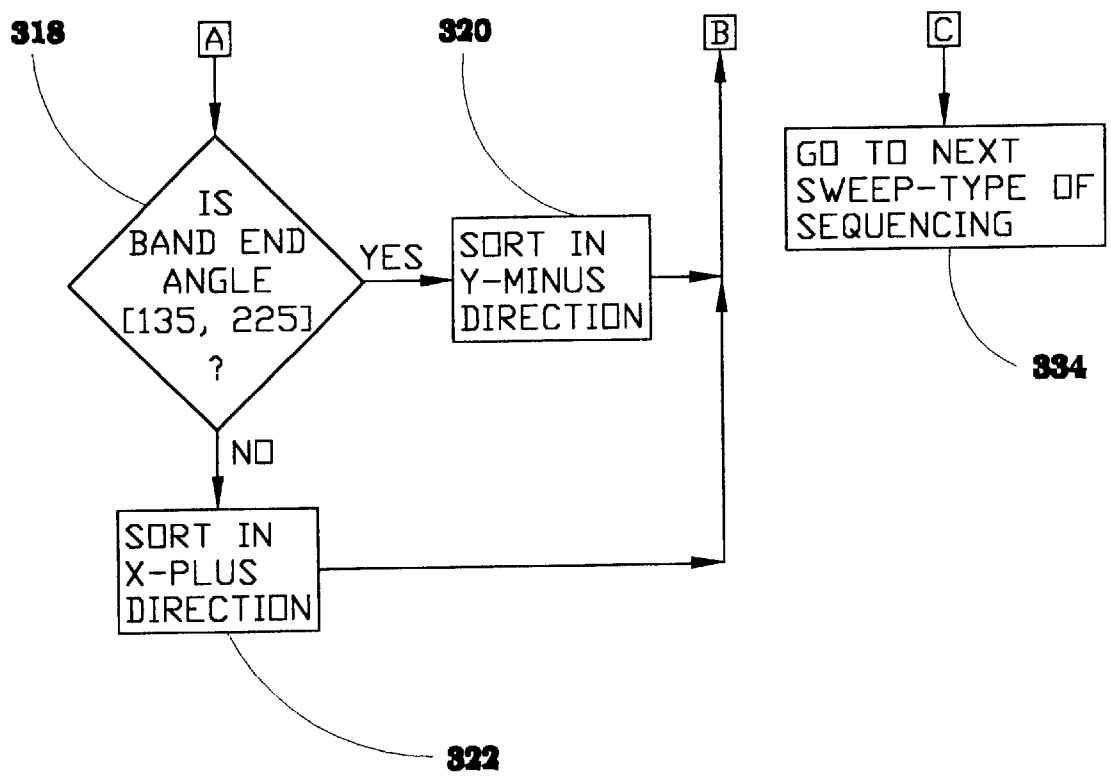

FIGS. 11C and 11D represent a flow chart for Radial Pie sweeps. Starting at a function block 300, the number of bands is set equal to one (1). Function block 302 now divides the part into "pie slices" by "N" number of bands. Of course, N=1 for the first sorting procedure. At a function block 304, the band number is set equal to one (1), regardless of the value of N.

By use of the table that contains all of the information concerning cut-outs, the current band is inspected to find all cut-outs within that band at a function block 306. It is preferred that the reference point of each cut-out be used to determine its location within a particular band, however, another basis for determining precisely where each cut-out lies within the structure of bands could be used, such as finding the geometric center (i.e., the centroid) of the cut-out.

At a decision block 308, it is determined whether or not any cut-outs exist within the current band. If the answer is YES, the logic flow is directed to another decision block 310 that determines whether or not the band end-angle is between the values of 45° and 315°. If the answer is YES, function block 312 sets the sort direction as Y-plus.

If the answer at decision block 310 was NO, then the logic flow is directed to a decision block 314 that determines whether or not the band end-angle is between the values of 45° and 135°. If the answer is YES, then a function block 316 sets the sort direction to X-minus. If the answer at decision block 314 was NO, the logic flow travels to a letter "A", which takes the logic flow to a decision block 318 on FIG. 11D.

Decision block 318 determines whether or not the band end-angle is between 135° and 225°. If the answer is YES, a function block 320 sets the sort direction to Y-minus. If the answer at decision block 318 was NO, then the sort direction is set to X-plus, at a function block 322. If the logic function arrives at function block 322, it can be accurately presumed that the band end-angle fell within the range of 225 degrees to 315 degrees. Once the sort direction has been determined, the logic flow on FIG. 11D is directed to a letter "B", which arrives at a decision block 324 on FIG. 11C. Furthermore, if the sort direction was determined by either decision block 310 or 314 on FIG. 11C, the logic flow is directed to the same decision block 324, or if there were no cutouts in the current band (leading to a NO result at decision block 308).

At decision block 324, it is determined whether or not there are any more bands to be done. If the answer is YES, then the logic flow travels to a function block 326 that increments the current band number, and then further directs the logic flow back to function block 306. If decision block 324 answers NO, then the logic flow travels to a function block 328 which performs an analysis of the re-sequenced program, including checking for interferences and calculating the total rapid-travel distance.

From function block 328, the next step is to increment the number of bands, at a function block 330. The logic flow then arrives at a decision block 332, which determines whether or not the maximum number of bands has been reached. If the answer is NO, the logic flow is directed back to function block 302. If the answer is YES, the logic flow is directed to a letter "C" which directs the logic flow onto FIG. 11D at a function block 334. At function block 334, the control system is instructed to go to the next sweep-type of sequencing.

Figure 12A:
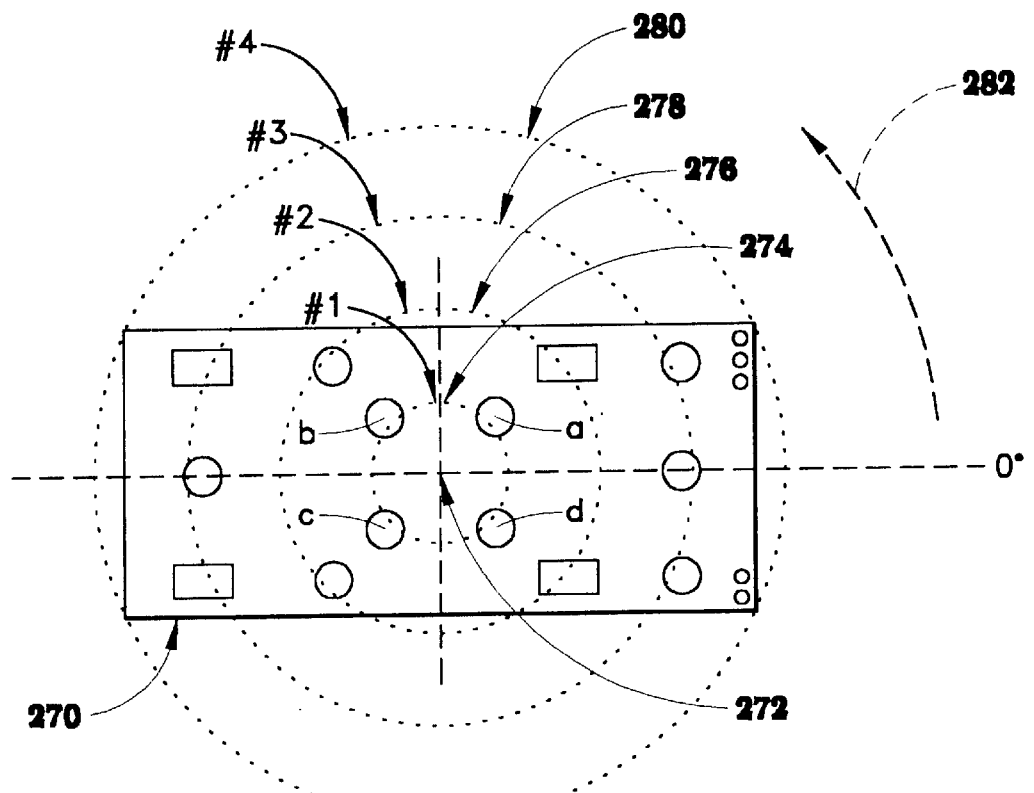
FIG. 12A depicts a graphical system using X-Y coordinates of a sheet material to be cut by a laser cutting machine in which the "sweep type" is a Radial Wave sweep, showing four (4) bands.

On FIG. 12A, another part made of sheet material, generally designated by the index numeral 270, is depicted. The type of sweep used in FIG. 12A is known as an "inside-out Radial Wave," in which each band is one of the concentric circles having a center at the centroid 272 of part 270. The outermost band (i.e., band #4 on FIG. 12A) preferably has a radius that will cause the circumference of the circle designated by the index numeral 280 to intersect at the far-most corner of the part 270. Since part 270 has a rectangular shape, the outer circle (at numeral 280) will intersect all four corners of this part, however, it will be understood that parts having other shapes could be used in which the outermost circle of the outermost band would intersect with the part at only a single point.

It is preferred that each of the concentric circles used in a Radial Wave sweep should have a radius that is incrementally larger by an equal amount as compared to the radius of the circle directly adjacent to the innermost edge of a particular band. In other words, if the radius of the circle designated by the index numeral 274 (i.e., for band #1) is equal to the dimension "R," then the radius for the next larger circle at index numeral 276 should be equal to the dimension 2R. Accordingly, the dimension for the next larger circle, at index numeral 278, should have a radius equal to the dimension 3R, and the outermost circle at index numeral 280 should have a radius equal to the dimension 4R. In this manner, each of the arcuate paths defined by the bands will have an equal "width" when traveling along any one of the bands upon crossing a particular angle (such as 0°).

The preferred sorting direction for each of the bands in FIG. 12A is in order of increasing angular value, i.e., in the counterclockwise direction, as shown by the dashed arrow 282. Therefore, when sweeping through band #2, the four (4) smaller circles that are to become cut-outs, designated by the letters "a", "b", "c", and "d" will be sorted in the order a-b-c-d.

In the case of an inside-out sweep, such as defined by the flow chart 12B, the order of the sweep would be band #1, band #2, band #3, then band #4. Of course, if one of these bands had no cut-outs at all, then no sorting would take place within that band, and therefore, band #1, as illustrated in FIG. 12A, having no cut-outs would not be sorted. Since the sort direction is always counterclockwise in the illustrated embodiment, it is preferred that the sort direction never be reversed when traversing from one band to the next. It will be understood, however, that any combination of band sizes and quantities, and sort directions could be used without departing from the principles of the present invention.

When using the Radial Wave sweep type, it will be understood that each of the cut-outs will be sorted according to only a single point on the X-Y coordinate system having a center origin (at the point 272 on FIG. 12A). This single point for each cut-out could be located at the centroid of the cut-out, or a reference point located at the start-of-cut point of the cut-out. Such a start-of-cut point is equivalent to the point defined by the index numeral 76 on FIG. 5A, or the index numeral 96 on FIG. 5B, for example. It will be understood that the "start-of-cut point" is the location of the cutting path where the laser beam initially touches the cutting path. For typical cut-outs, the start-of-cut point is the same location as the end-of-cut point.

If two of the cut-outs have a reference point that is located at exactly the same angle with respect to the origin of the co-ordinate system (at index numeral 272) for a particular part, then a geometric convention must be chosen to determine which of these cut-outs should be sorted first. Several alternatives could be used, including sorting by the minimum radius from the origin 272, the maximum radius from the origin 272, or sorting in the same order as the original ordered list created by the CAD/CAM software, as per function block 112 on FIG. 6. In the illustrated embodiment, it is preferred to use the order derived from the original ordered list rather than having to analyze which of the cut-outs has the smaller or larger radius at its reference point.

Figure 12B:
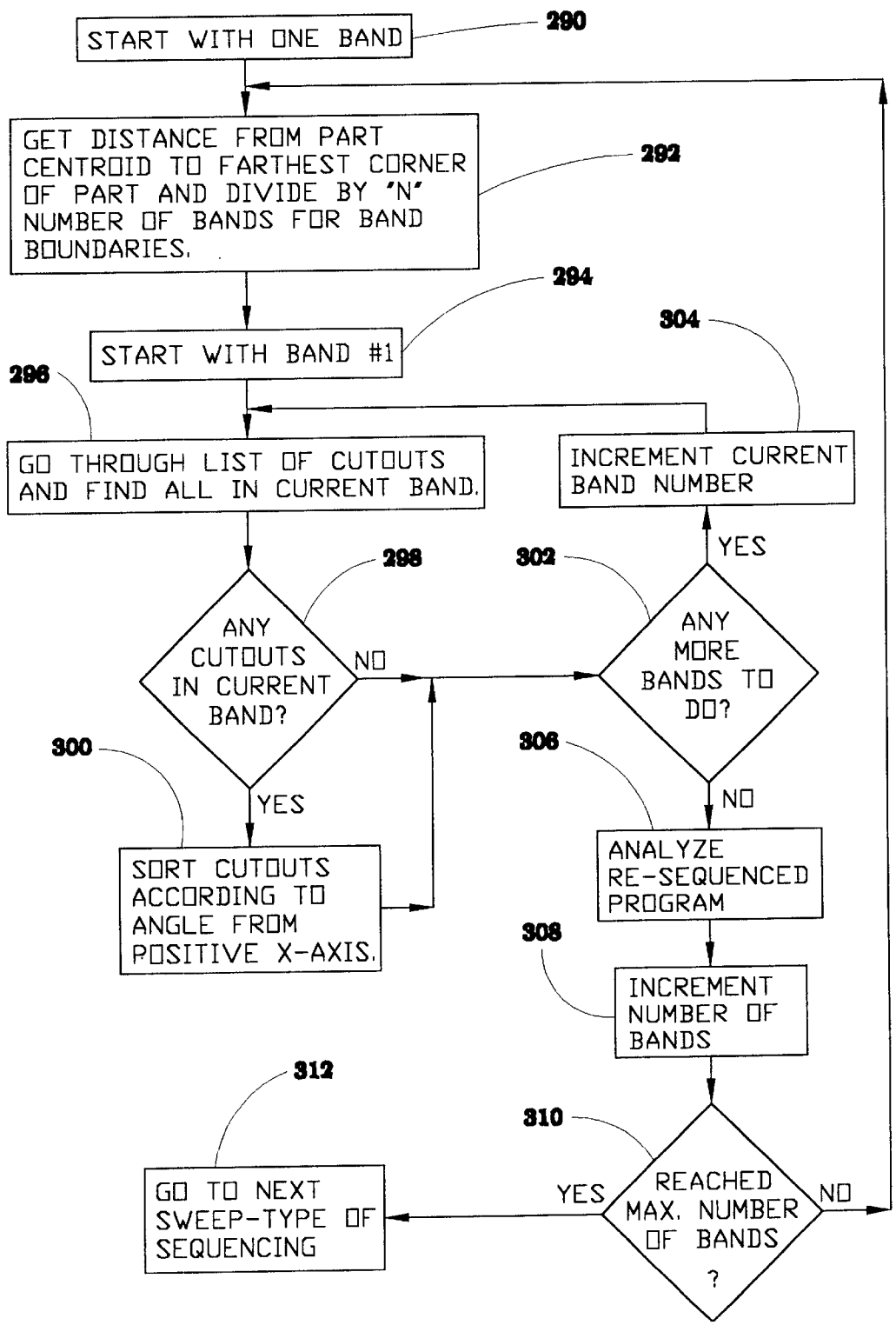
FIG. 12B is a flow chart showing the logical operational steps required to perform an inside-out Radial Wave sweep as part of the analysis of the tool path depicted in FIG. 6.

FIG. 12B is a flow chart that describes the logical steps required to perform a Radial Wave sweep from the inside-out, starting with a function block 290 that sets the number of bands equal to a value of one (1). After that, the distance from the centroid of the part 270 to its farthest corner is determined at a function block 292, and then divided by "N" number of bands to determine the band boundaries. As in the case with other types of sweeps, a convention should be chosen to determine precisely where each band will start and stop at boundaries between bands. For example, it is preferred that band #1 comprise the circle having a radius greater than or equal to zero and a radius less than the dotted circle 274. Correspondingly, band #2 preferably will comprise the area greater than or equal to the radius of circle 274, and less than the circle 276. Bands #3 and #4 will correspondingly include the areas greater than or equal to the circle 276 and less than the circle 278 (for band #3), and the area greater than or equal to the circle 278 and less than the circle 280 (for band #4). All of these calculations and logical decisions take place according to function block 292.

At a function block 294, the band number is set equal to one (1), regardless of the value for N. In the next step at a function block 296, the data table containing the numeric information for all of the cut-outs is inspected to ascertain all cut-outs that exist within the current band. At a decision block 298, it is determined whether or not any cut-outs exist within the current band, and if the answer is YES, the logic flow is directed to a function block 300. According to function block 300, the cut-outs within the current band are sorted according to angular position of the reference point for each cut-out (e.g., at the cut-out's centroid, or at its start-of-cut point), and this sort occurs in order of positive angle starting at the 0° axis. The logic flow then travels to a decision block 302.

If the answer at decision block 298 was NO, then the logic flow also arrives at decision block 302, where it is determined whether or not any more bands remain to be sorted. If the answer is YES, a function block 304 increments the current band number, and the logic flow is directed back to function block 296. If the answer was NO at decision block 302, then the re-sequenced program is analyzed to determine whether or not any head-up/head-down operations are required, and also the cumulative amount of rapid-travel distance is ascertained, at a function block 306. After this occurs, a function block 308 increments the number of bands. A decision block 310 now determines whether or not the maximum number of bands has been reached. If the answer is NO, the logic flow is directed back to function block 292. If the answer is YES, the logic flow is directed to a function block 312, which instructs the system to undergo further sequencing with the next type of sweep.

Figure 13A:
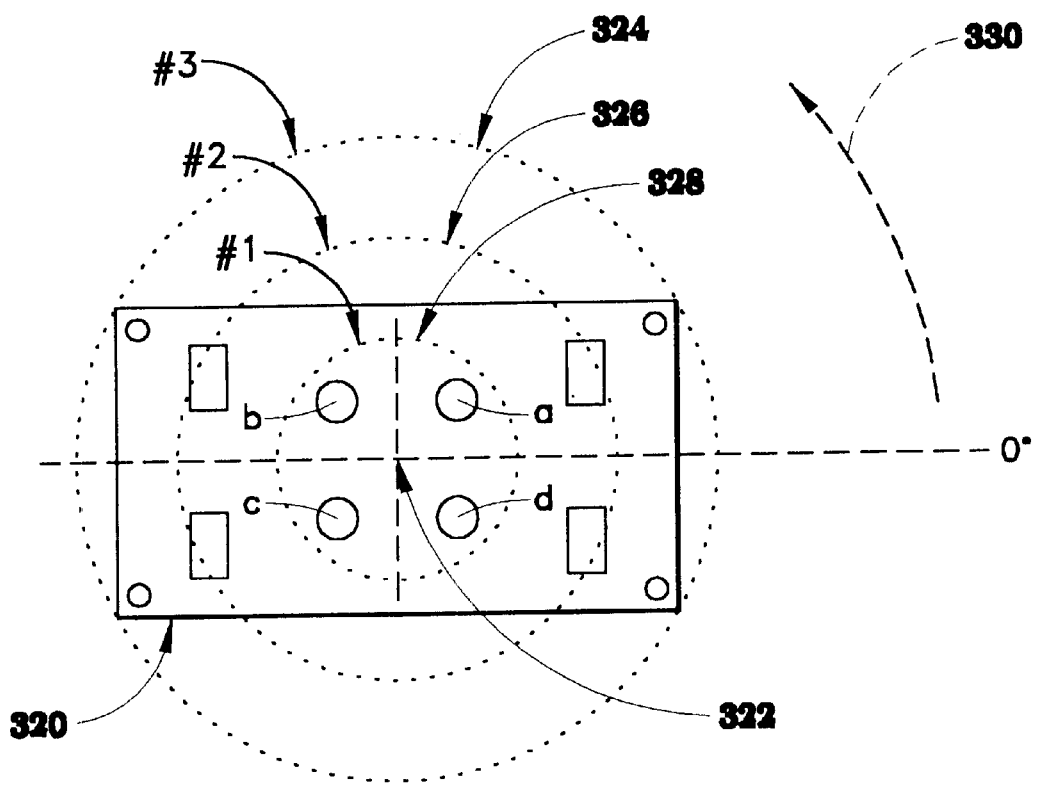
FIG. 13A depicts a graphical system using the X-Y coordinates of a sheet material to be cut by a laser cutting machine in which the "sweep type" is a outside-in Radial Wave sweep, showing three (3) bands.

FIG. 13A shows a part designated by the index numeral 320 that is to be analyzed using an "outside-in Radial Wave" sweep. In this figure, three (3) bands are laid out as concentric circles having their center at the centroid of part 320, which is the point designated by the index numeral 322. As in the above example of FIG. 12A, the radius of the outermost circle, designated by the index numeral 324, preferably is of the precise length so as the circumference of circle 324 will intersect the outermost corner of part 320. Since part 320 is depicted as a rectangle in FIG. 13A, circle 324 will intersect part 320 at each of its four corners.

Band #1 preferably will include the area of the circle having a radius greater than or equal to zero and less than the circle designated by the index numeral 328. Using this same convention, band #2 will include the area greater than or equal to the radius at circle 328 and less than the radius at circle 326. Similarly, band #3 will include the area greater than or equal to the circle 326 and less than the circle 324. All cut-outs that fall within these various circle segments will be analyzed according to which of the individual bands the cut-outs fall within.

It is preferred that the incremental radius between bands be equal, i.e., if the radius between the origin 322 and circle 328 is equal to the dimension "R," then the radius between the origin 322 and circle 326 should be equal to the dimension 2R, and the radius between the origin 322 and the circle 324 should be equal to the dimension 3R.

When sweeping through a particular band, it is preferred that the sort order be according to an increasing angle (i.e., counterclockwise on FIG. 13A), as indicated by the dashed arrow 330. As in the case of the inside-out Radial Wave-type sweep, it is preferred that the sorting for each band begin at the zero angle, or in other words, along the positive X-axis. Using this convention, then the four small circles designated by the letters "a", "b", "c", and "d" would be sorted in the order a-b-c-d.

The choice of what reference point to use for each cut-out can be made as according to one of many various schemes, and preferably, the reference point for each cut-out will be set to its start-of-cut point. Of course, other logical points for each cut-out could be used instead, such as the centroid of each cut-out. Using this convention, all of the circles a, b, c, and d would fall within band #1 on FIG. 13A. Since FIG. 13A depicts an outside-in Radial Wave, the sorting of these bands will be in the order of band #3, band #2, and then band #1. At first glance, this may logically seem no different from an inside-out Radial Wave sweep, however, since the order of sorting from cut-out to cut-out will ultimately control the movements of the laser head 20, it could make a significant difference as to the precise location the head movements begin with respect to the part 320.

Figure 13B:
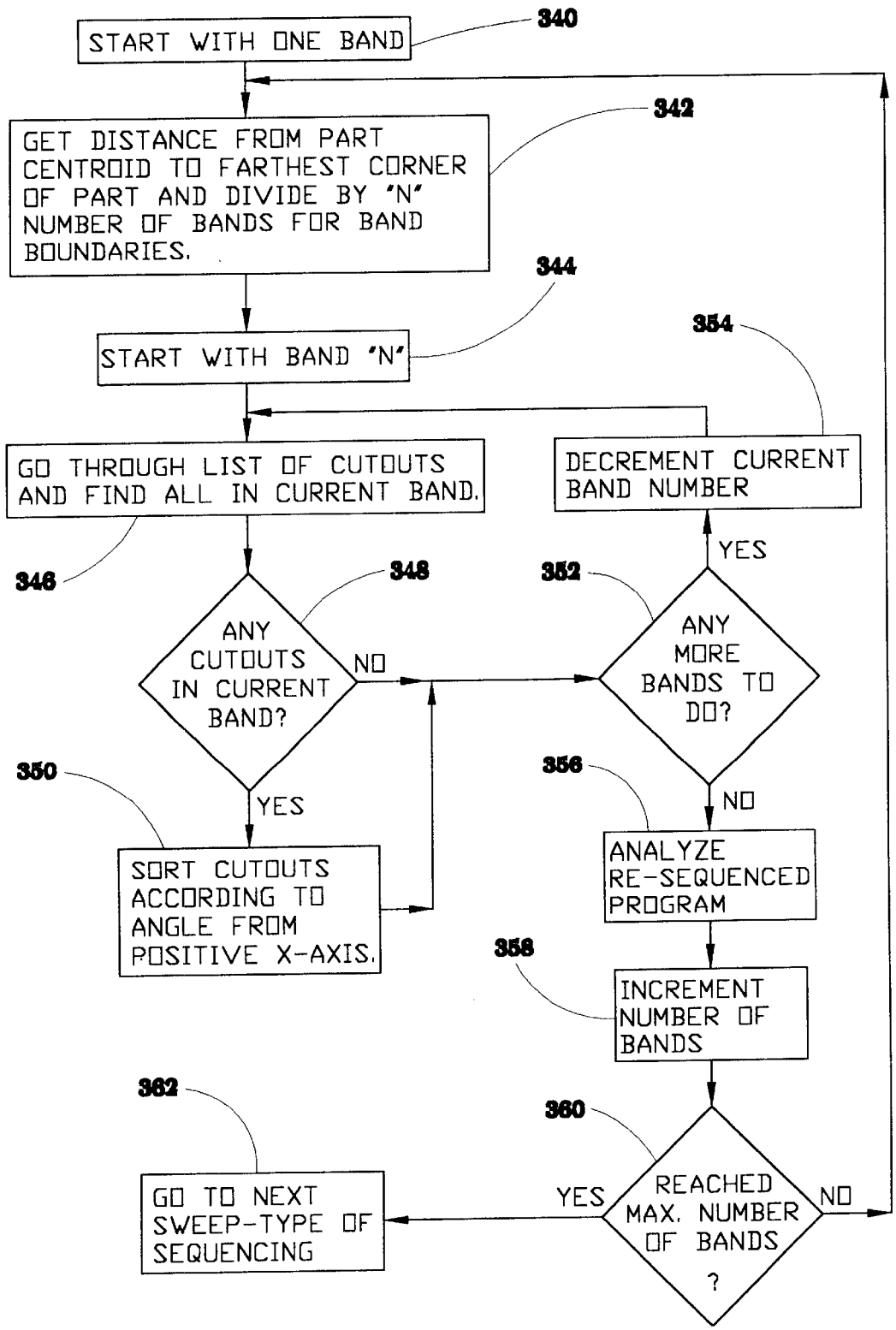
FIG. 13B is a flow chart showing the logical operational steps required to perform a outside-in Radial Wave sweep as part of the analysis of the tool path depicted in FIG. 6.

FIG. 13B is a flow chart describing the logical operational steps for the outside-in Radial Wave sweep type, beginning with a function block 340 that begins with a single band (or, in other words, sets the value for N equal to one (1)). At a function block 342, the distance from the centroid 322 of the part 320 is measured to the farthest corner of the part, and divided by the present value of the quantity "N" to determine the boundaries between the bands.

In the next step, at a function block 344, the system is directed to begin with band "N," which is the opposite as described in FIG. 12B where the system started with band #1. In FIG. 13A, the value for N would be set equal to three (3), so function block 344 would set the system to look at band #3.

In the next step, a function block 346 would inspect the data table that contained the numeric data for all of the cut-outs of part 320 in order to find all cut-outs that reside within the current band. At a decision block 348, it would be determined whether or not there were any cut-outs within the current band. If the answer is YES, then a function block 350 will sort the cut-outs according to a positive angle (i.e., counterclockwise), starting at the 0° angle (i.e., at the positive X-axis). After that has occurred, the logic flow is directed to a decision block 352.

If the answer at decision block 348 was NO, then the logic flow also arrives at decision block 352, which determines whether or not there are any more bands to be sorted. If the answer is YES, then a function block 354 decrements the current band number. In the illustrated example, the band number would be decremented from N=3 to the value N=2.

If the answer at decision block 352 was NO, then a function block 356 will analyze the re-sequenced program of cut-outs, to determine whether or not there are any head-up/head-down movements required, and to determine the cumulative total of all rapid-travel distance. After that has occurred, a function block 358 will increment the number of bands. A decision block 360 then determines whether or not the maximum number of bands has been reached. This maximum number of bands would typically be set to a value in the range of twenty (20) to thirty (30), and can be adjusted by a human user. If the answer is NO, the logic flow is directed back to function block 342. If the answer was YES, the logic flow is directed to a function block 362 which instructs the system to continue sequencing with the next sweep-type (if any).

Once all types of sweeps for all bands has been accomplished, an optimal re-sequenced program will have been determined, as according to function block 116 on FIG. 6. To be able to arrive at this function block 116 assumes that a re-sequenced tool path was found that contains no head-up/head-down operations. Otherwise, the optional sequencing would be invoked to arrive instead at function block 150 on FIG. 8. In either case, the "best" possibility should include the minimum amount of rapid-travel distance to perform all of the cut-outs on a particular part, although at function block 150, the more important quantity is likely to be the minimum number of interferences which would require a head-up/head-down operation.

In all cases, it is preferred to now select the appropriate lead-in angle or location for each of the cut-outs on the part that has been re-sequenced. FIGS. 14A–14E depict a flow chart that describes the preferred way for creating a new set of lead-ins for these cut-outs. Starting at a function block 400 on FIG. 14A, a "TO" pointer is set to be equal to the "last" internal cut-out, which refers to the pierce point for the current optimal re-sequenced program sort order. At a function block 402, a "FROM" pointer is set to the "second-to-last" internal cut-out location. This cut-out location in function block 402 is also at the pierce point, for the second-to-last cut-out.

The TO-pointer and FROM-pointer represent the starting and stopping points of a particular rapid-travel movement by laser head 20. These motions by laser head 20 will be analyzed with respect to the X-axis and Y-axis, much as was depicted on FIG. 3 for a particular part. Accordingly, the TO-pointer and FROM-pointer each have a co-ordinate on the X-Y plane, so each of these pointers has an X-value and a Y-value.

Now that the TO-pointer and FROM-pointer have been determined, a decision block 404 determines whether or not the "X" distance between the FROM-pointer and TO-pointer is greater than the "Y" distance. If the answer is YES, then the precedence is set to "X-Precedence," by a function block 406. On the other hand, if the answer was NO, then a function block 408 sets the precedence to "Y-Precedence."

After the precedence type has been determined, a decision block 410 determines if the "X" direction is positive. If the answer is NO, then the logic flow travels to a letter "A" which directs the logic flow to FIG. 14B, described in greater detail hereinbelow. If the answer at decision block 410 was YES, then the logic flow travels to another decision block 412 which determines whether or not the "Y" direction is positive. If the answer is YES, then the logic flow travels to a letter "B" which directs the logic flow to FIG. 14E, described in greater detail hereinbelow.

If the answer at decision block 412 was NO, then a function block 414 sets the lead-in location for the second-to-last cut-out to quadrant #4. It will be understood that, for the illustrated example in FIGS. 14A–14E, all of the cut-outs have a circular shape. Now that quadrant #4 has been selected, function block 414 will set the angle equal to 0° if the precedence type is X-Precedence, and will set the angle equal to 270° if the precedence type is Y-precedence. After that has occurred, the logic flow travels to a decision block 416.

At decision block 416, it is determined whether or not the FROM-pointer is at the "first" cut-out. If the answer is YES, then the system has finished setting all of the lead-ins for the entire part. If the answer is NO, then a function block 418 sets the TO-pointer to the cut-out that was pointed to by the FROM-pointer (i.e., the immediately previous cut-out in the sort order). A function block 420 then decrements the FROM-pointer to the preceding cut-out in the part program. The logic flow is then directed back to decision block 404.

Figure 14A:
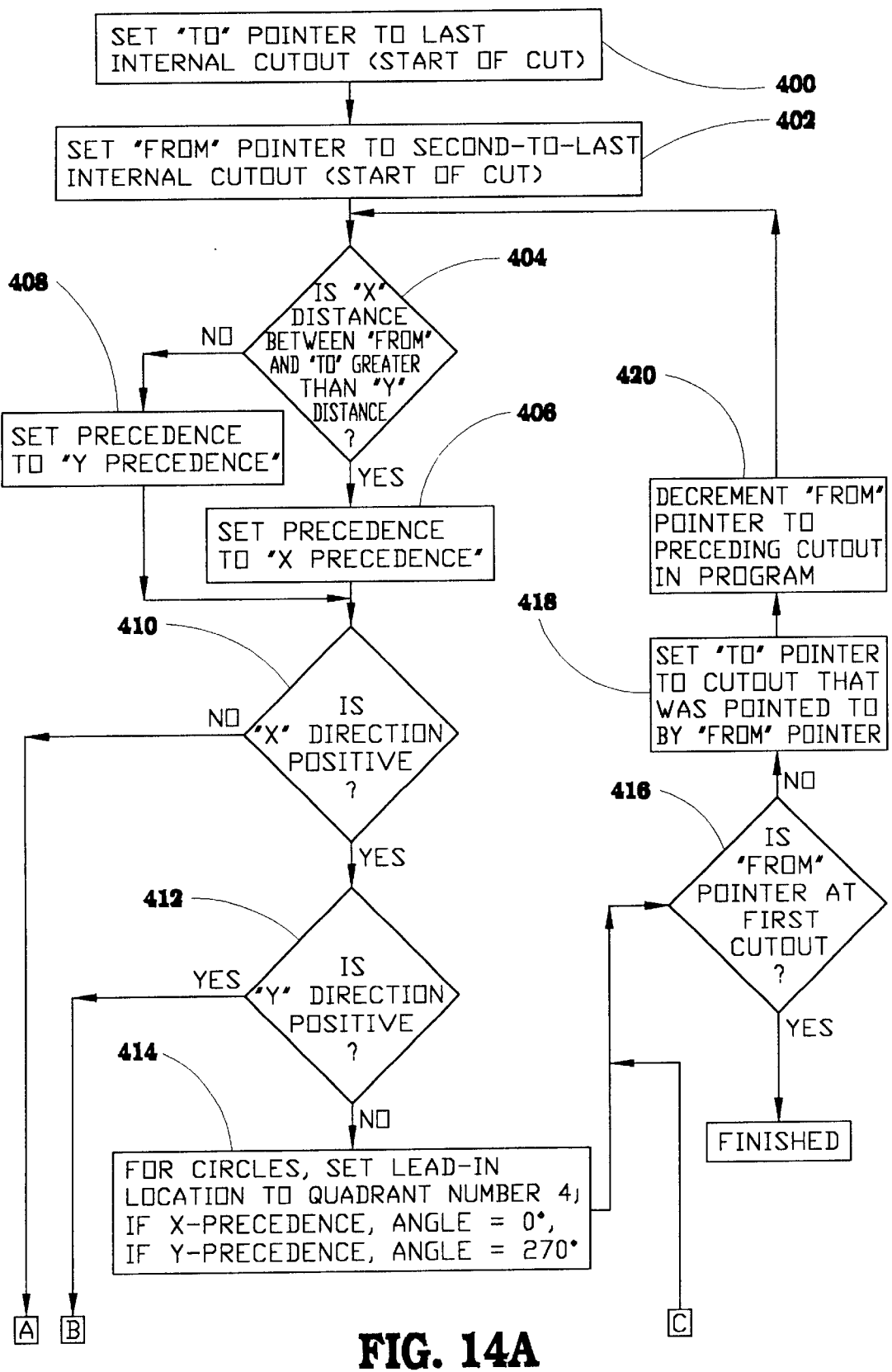
FIGS. 14A–14E are a flow chart depicting the logical steps required to calculate lead-ins as part of the analysis of the tool path of FIG. 6.
Figure 14B:
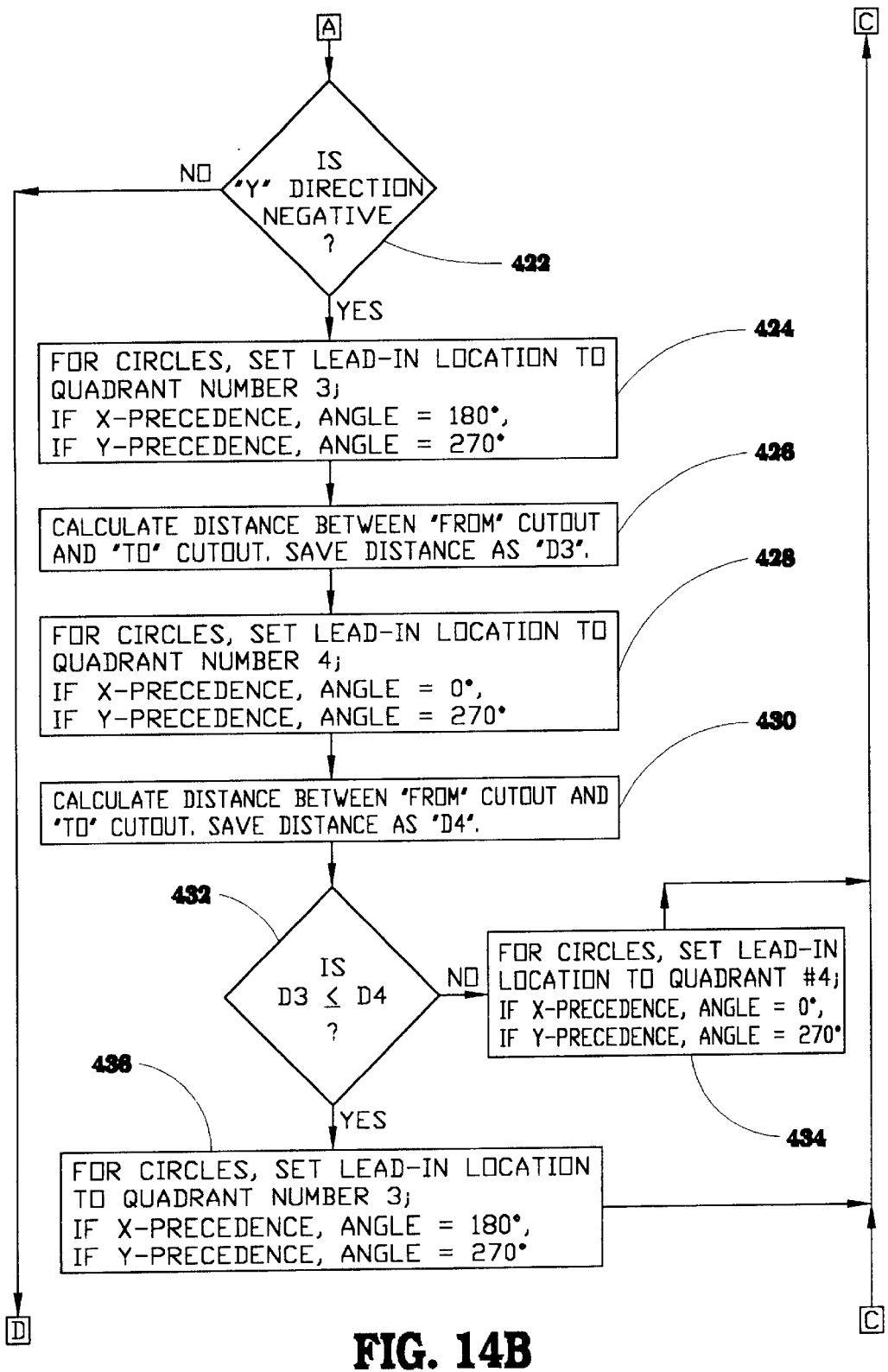

If decision block 410 determines that the X-direction is negative, then the logic flow is directed to a decision block 422 on FIG. 14B, via the letter "A." Decision block 422 now determines whether or not the Y-direction is negative, and if the answer is NO, the logic flow is directed to a letter "D" which directs the logic flow to FIG. 14C, discussed in greater detail hereinbelow.

If the answer at decision block 422 was YES, then the logic flow is directed to a function block 424 that sets the lead-in location to quadrant #3. The lead-in angle is set depending upon precedence type, and if X-Precedence, the angle is set to 180°; on the other hand, if Y-Precedence, the angle is set to 270°. At a function block 426, the distance is now calculated between the "FROM" cut-out and "TO" cut-out, and this distance is saved as a variable named "D3."

As an alternative calculation, a function block 428 now sets the lead-in location to quadrant #4, and if X-Precedence, the angle is set equal to 0°. If Y-Precedence, the angle is set to 270°. A function block 430 now calculates the distance between the FROM cut-out and the TO cut-out, and saves this distance as a variable "D4." At a decision block 432, it is determined whether or not the value for D3 is less than or equal to the value for D4. If the answer is NO, then the lead-in location is set to quadrant #4, and for X-Precedence, the angle is set to 0°; for Y-Precedence, the angle is set to 270°, by a function block 434.

If the answer at decision block 432 was YES, then the lead-in location is set to quadrant #3, and for X-Precedence, the angle is set to 180°. For Y-Precedence, the angle is set to 270°, by a function block 436. The logic flow now leaves either function block 434 or function block 436 and is directed to a letter "C" which brings the logic flow back to FIG. 14A, and is directed to decision block 416.

Figure 14C:
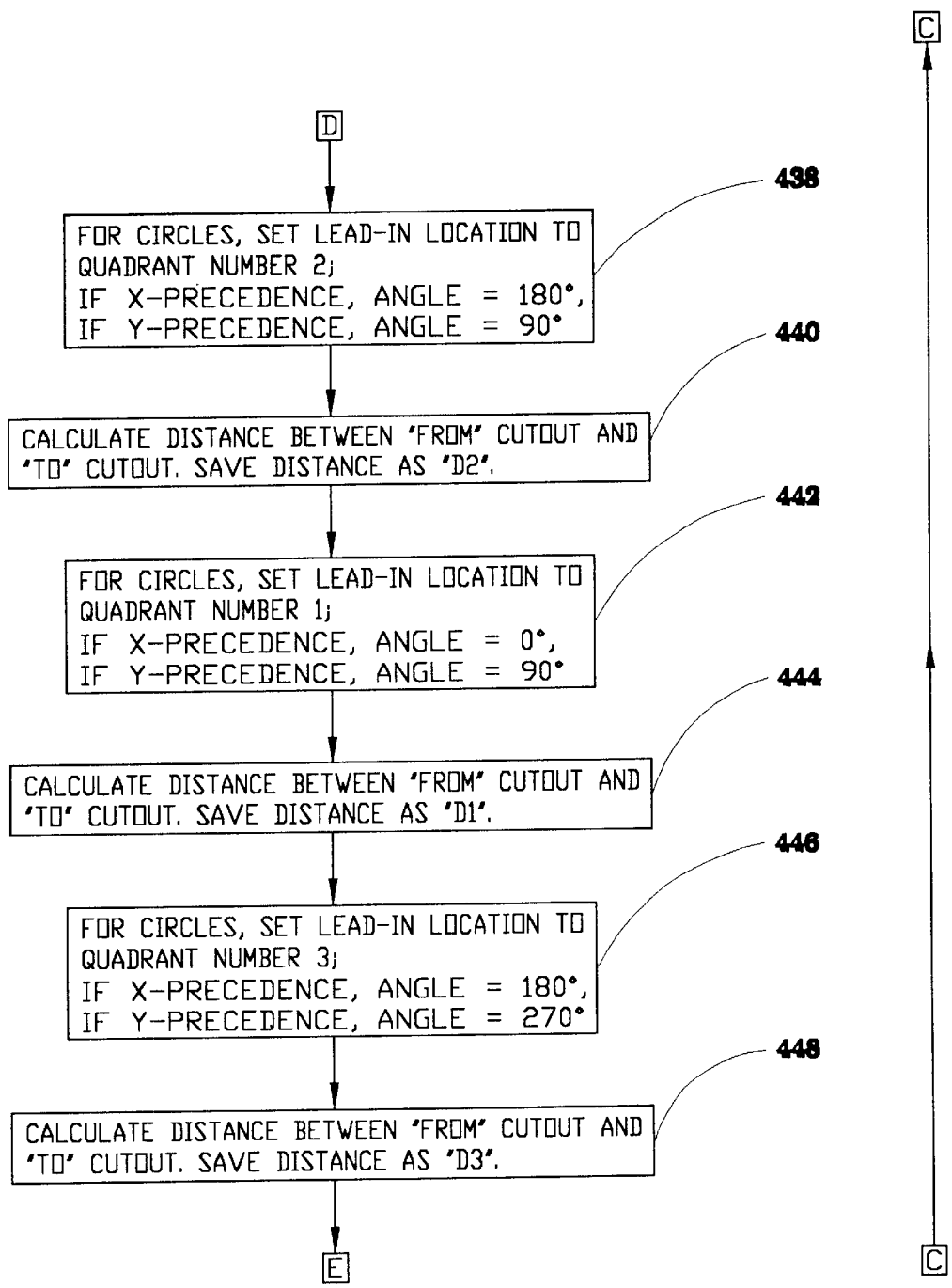
Figure 14D:
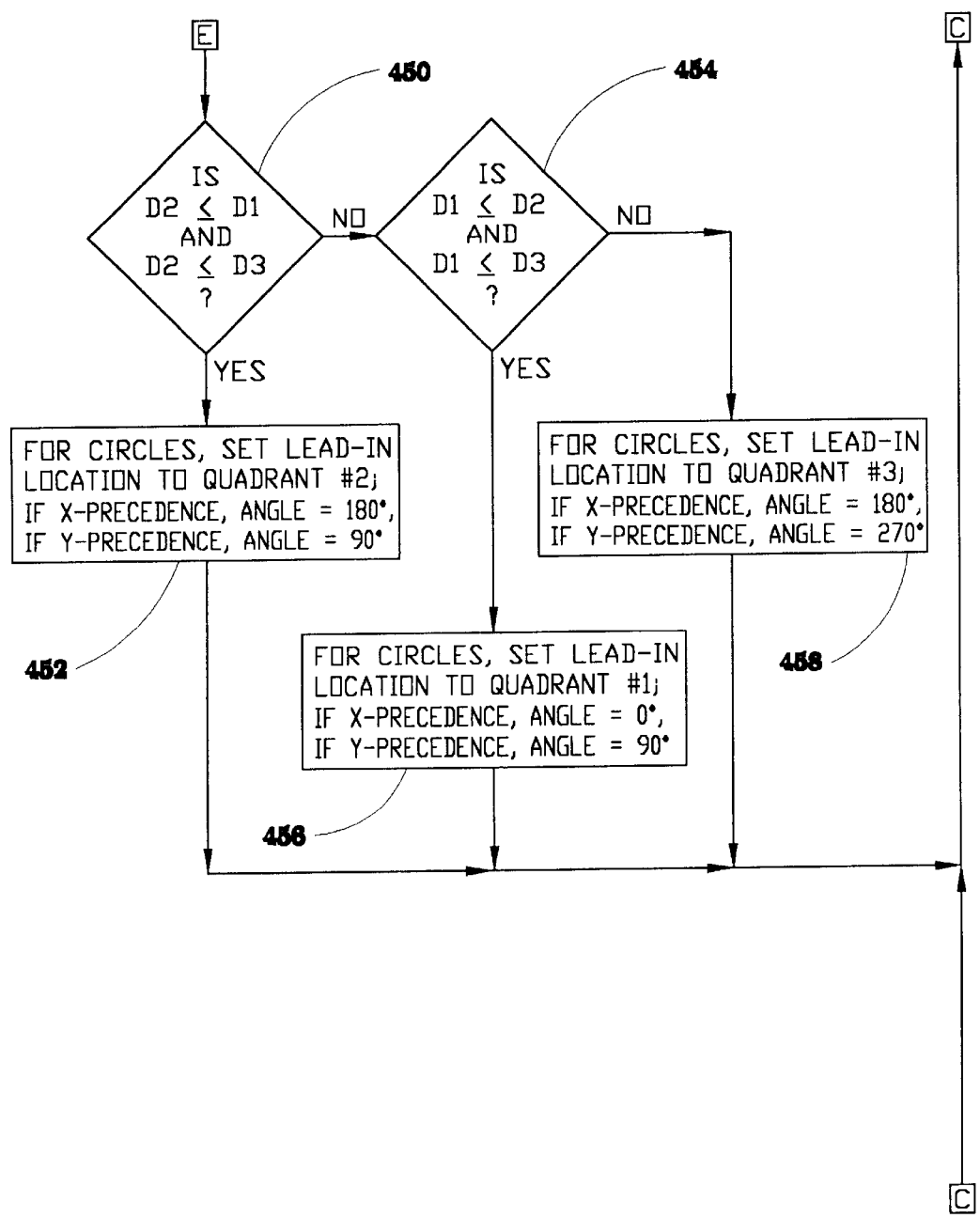

If the X-direction was negative and the Y-direction was positive, the logic flow would have ended up at letter "D" at the top of FIG. 14C. Following this logic,flow, a function block 438 sets the lead-in location to quadrant #2, and the lead-in angle is set equal to 180° if X-Precedence, or 90° if Y-Precedence. A function block 440 then calculates the distance between the FROM cut-out and the TO cut-out, and saves that distance as a variable "D2." A function block 442 now sets the lead-in location to quadrant #1, and sets the angle to 0° if X-Precedence, or to 90° if Y-Precedence. The distance is calculated between the FROM cut-out and the TO cut-out, and that distance is saved as a variable "D1," at a function block 444.

The lead-in location is now set to quadrant #3 at a function block 446. The angle is set to 180° if X-Precedence, or to 270° if Y-Precedence. At a function block 448, the distance between the FROM cut-out and the TO cut-out is determined, and this distance is saved as the variable "D3." The logic flow now travels to the letter "E", which directs the logic flow to a decision block 450 on FIG. 14D.

At decision block 450, the question is asked, "is D2 less than or equal to D1, and is D2 less than or equal to D3?" If the answer is YES, then a function block 452 sets the lead-in location to quadrant #2. If at X-Precedence, the angle is set to 180°, and if at Y-Precedence, the angle is set to 90°.

If the answer at decision block 450 was NO, the logic flow is directed to a decision block 454 that asks the question, "is D1 less than or equal to D2, and is D1 less than or equal to D3?" If the answer is YES, then a function block 456 will set the lead-in location to quadrant #1. If at X-Precedence, the angle is set equal to 0°, and if at Y-Precedence the angle is set to 90°. If the answer at decision block 454 was NO, then a function block 458 sets the lead-in location to quadrant #3. If at X-Precedence, the angle is set equal to 180°, and if at Y-Precedence the angle is set to 270°. The logic flow is now directed to the letter "C", which directs the logic flow back to decision block 416 on FIG. 14A.

Figure 14E:
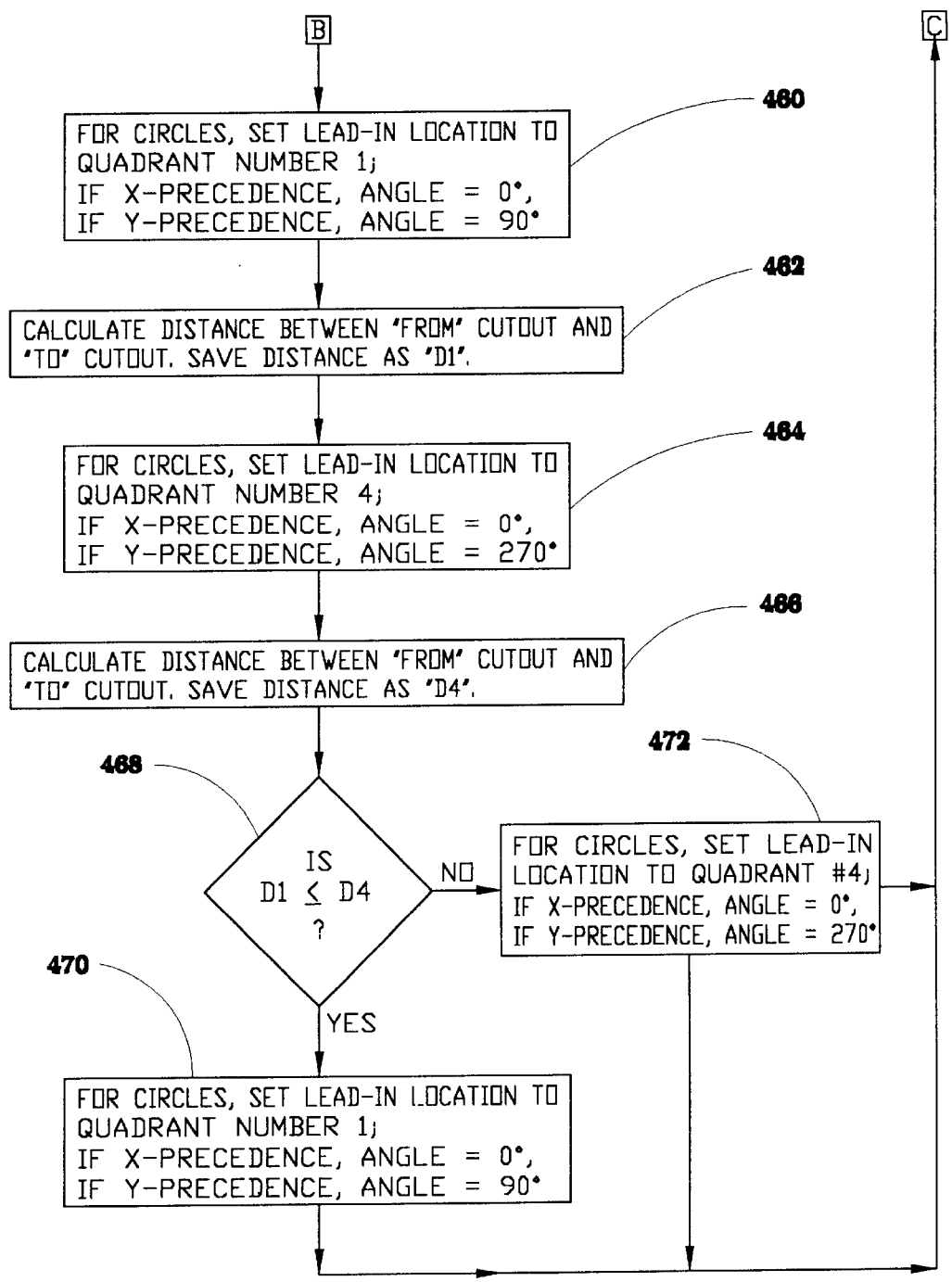

If both the X-direction and Y-direction were positive, then the logic flow would be directed to the letter "B" on FIG. 14E. On FIG. 14E, a function block 460 sets the lead-in location to quadrant #1. If at X-Precedence, the angle is set equal to 0°, and if at Y-Precedence the angle is set to 90°. A function block 462 calculates the distance between the FROM cut-out and the TO cut-out. This distance is saved as the variable "D1."

A decision block 464 now sets the lead-in location to quadrant #4, and if at X-Precedence the angle is set to 0°, and if at Y-Precedence the angle is set to 270°. A function block 466 now calculates the distance between the FROM cut-out and the TO cut-out, and saves this distance as the variable "D4."

A decision block 468 now determines whether or not D1 is less than or equal to D4. If the answer is YES, a function block 470 sets the lead-in location to quadrant #1. If at X-Precedence, the angle is set to 0°, and if at Y-Precedence the angle is set equal to 90°.

If the answer at decision block 468 was NO, then a function block 472 sets the lead-in location to quadrant #4. If at X-Precedence, the angle is set equal to 0°, and if at Y-Precedence the angle is set equal to 270°. At this point in the flow chart of FIGS. 14A–14E, all possibilities for angular locations for the lead-in have been analyzed, and the logic flow is now directed back to the letter "C", which directs the logic flow to decision block 416 on FIG. 14A.

It will be understood that the possible lead-in angles used in the illustrated embodiment, i.e., 0°, 90°, 180°, or 270° for circular cut-outs, could have been chosen at other angular values without departing from the principles of the present invention. Moreover, the lead-in angles for other shapes (such as squares, rectangles, etc.) could be chosen at angular values other than along a diagonal (e.g., 45°, 135°, 225°, or 315° for squares), or at angular values other than along an orthogonal axis (such as 0°, 90°, 180°, or 270°, e.g., for ellipses) without departing from the principles of the present invention.

Figure 15:
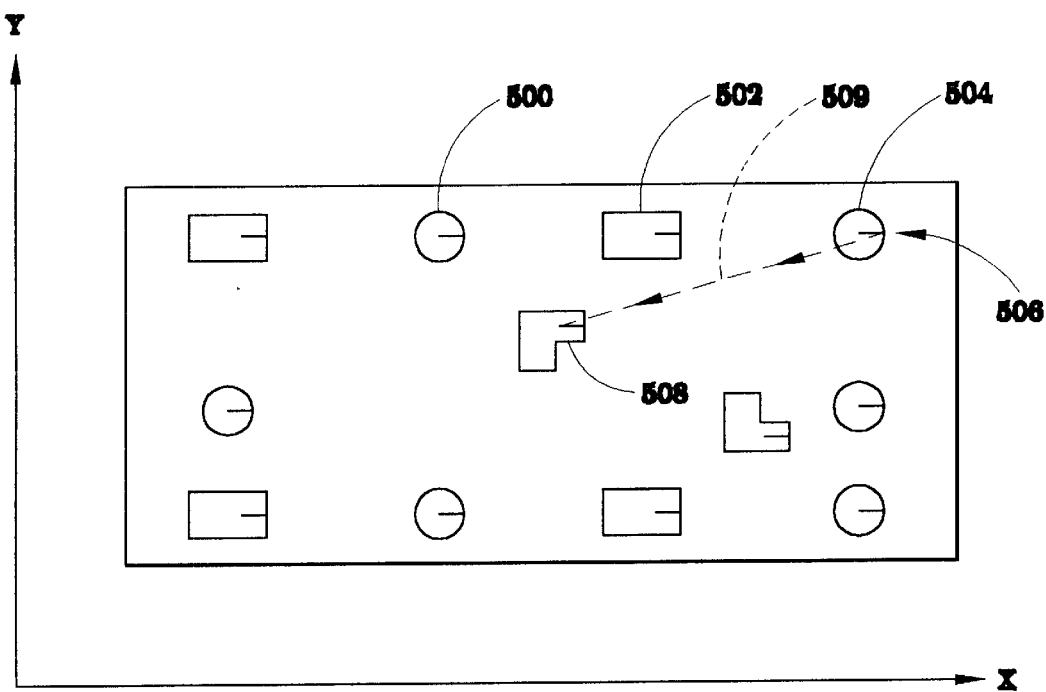
FIG. 15 is a top plan view of a sheet of material depicting an example of lead-in angles on cut-outs as determined by a conventional CAD/CAM software product.

It will be further understood that the rather tedious tasks performed in the flow chart of FIGS. 14A–14E were designed strictly to determine the optimum lead-in angle or location for each of the cut-outs to be made by laser head 20. FIG. 15 depicts an example of lead-in angles as determined by a conventional CAD/CAM software product, and it can be easily seen that each cut-out has a lead-in angle that is identical to each of the other lead-in angles. This is true for both circular lead-in cut-outs (e.g., see cut-out 500), and rectangular cut-outs (e.g., see cut-out 502). This is also true regardless of which of the cut-outs is the starting point or the ending point.

Figure 16:
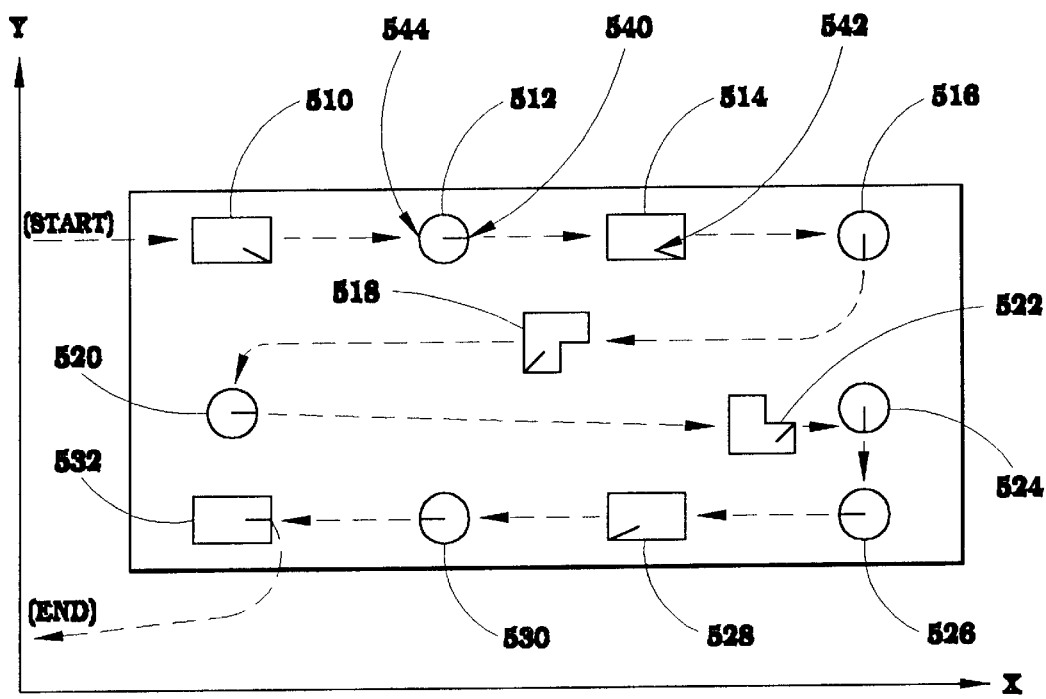
FIG. 16 is a top plan view of a sheet of material depicting an example of lead-in angles on cut-outs as determined by the present invention.

In contrast, FIG. 16 shows an example of lead-in angles as determined by the present invention. As can be easily seen in FIG. 16, the lead-in angles can be quite different between various cut-outs. For example, the circular cut-outs have lead-in angles that correspond to either the X-axis or the Y-axis, and the rectangular shapes have lead-in angles that correspond to the angle of the diagonal line that bisects the rectangles.

Upon a close inspection of FIG. 16, it can be seen that the cut-out at the "start" point (i.e., the cut-out 510) has a lead-in angle that is more or less "aimed" at the next cut-out to be made, i.e., cut-out 512. Moreover, the lead-in angle at cut-out 512 is "aimed" at the next shape to be cut out, i.e., cut-out 514. This example assumes essentially that the present invention has found an X-sweep to be the optimum sweep for minimum rapid-travel distance. Laser head 20 would make the cut-outs in the following order: starting at cut-out 510, it would continue on to other cut-outs 512, 514, 516, 518, 520, 522, 524, 526, 528, 530, and finally the ending cut-out 532.

In all cases on FIG. 16, the lead-in angle is generally "aimed" to the "next" cut-out, and the purpose of this is to ensure that laser head 20 will not attempt to rapid-travel directly over the cut-out that was just made. In other words, if laser head 20 had just finished making the circular cut-out 512, and the next shape to be cut is cut-out 514, then laser head 20 will proceed at rapid-travel speed directly to the right (as seen on FIG. 16) from the end-of-cut point 540 of cut-out 512 to the rectangular box surrounding the shape of cut-out 514. More specifically, laser head 20 will be commanded to rapid-travel from the end-of-cut point 540 for cut-out 512 to the pierce point 542 of cut-out 514. This motion is essentially directly to the right, having a near 0° direction of travel. It will be understood that it would not have been desirable to have the end-of-cut point for shape 512 located at the 180° point along its circular shape (i.e., at the point 544), because laser head 20 would then have to perform a head-up/head-down operation merely to pass over the cut-out 512 that was just previously made. This would be a very inefficient use of time in the movements of laser head 20.

Further emphasizing this point, when viewing the cut-out 504 on FIG. 15, it can be seen that its end-of-end cut point would be located at index numeral 506. If the laser head 20 were to then move to the next cut-out, at index numeral 508, it would have to perform a head-up/head-down operation merely to clear the shape of the (just previously made) cut-out at 504, in which the proposed rapid-travel movement would be along the dashed line 509. As can be seen by the above examples, incorporating this flexibility in choosing lead-in angles can have a significant impact on the efficiency of operation of laser head 20.

In some applications, there may be one or more "critical" cut-outs in which it would be impermissible to relocate the lead-in cut. Even if all cut-outs for a particular sheet of material were such "critical" cut-outs so that none of the lead-ins could be repositioned, the present invention nevertheless has other advantages in more efficiently and rapidly controlling a laser cutting machine.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. A method of using a machine for cutting features in material, said machine having a cutting instrument, said cutting instrument undergoing cutting movements while cutting said features and non-cutting movements while traveling between said features and said cutting movements, said method comprising the steps of:
   (a) creating a data file that contains a description of a plurality of features to be cut in said material;
   (b) identifying a plurality of paths, each respective path of said plurality of paths comprising each respective non-cutting movement which said cutting instrument would follow between each of said features arranged in a respective sequence if said cutting instrument were to follow said respective path;
   (c) selecting a path from said plurality of paths based on criteria which includes determination of which of said plurality of paths, if followed by said cutting instrument in between cutting said features, would pass over the fewest number of previously cut features;
   (d) utilizing said path selected to create a tool path for said cutting instrument to follow, said tool path comprising said cutting movements and said non-cutting movements; and
   (e) causing said cutting instrument to follow said tool path.

2. The method of claim 1 wherein those portions of said tool path between said features comprise the path selected.

3. The method of claim 1 wherein respective cutting movements include respective lead-in paths.

4. The method of claim 3 comprising the step of determining respective orientations for said lead-in paths.

5. The method of claim 3 comprising the step of determining respective location of said respective lead-in paths.

6. The method of claim 5 comprising the step of determining respective orientations for said lead-in paths.

7. The method of claim 1 comprising the step of adding respective lead-in paths to said respective features.

8. The method of claim 7 wherein the step of adding respective lead-in paths comprises the step of:
   (a) in reverse order of said respective sequence, for a plurality of respective pairs of features within said respective sequence, each said respective pair comprising a respective first feature and a respective second feature, said second feature being the feature which immediately precedes said first feature in said respective sequence, determining the respective relative position between a first initial location associated with said first feature and a second initial location associated with said second feature.

9. The method of claim 8 wherein the step of adding respective lead-in paths comprises the step of adding a lead-in path for said second respective feature based on said respective relative position.

10. The method of claim 8 wherein the step of adding respective lead-in paths comprises determining whether said respective relative position is X precedence or Y precedence.

11. The method of claim 10 wherein the step of adding respective lead-in paths comprises determining whether said second initial location is in a positive direction from said first initial location.

12. The method of claim 8 wherein said respective initial locations are respective predetermined starts of cuts for said respective features.

13. The method of claim 1 wherein the path selected is a path of said plurality of paths which require the least amount of time for said cutting instrument to travel.

14. The method of claim 1 wherein the path selected is a path of said plurality of paths which requires the least distance for said cutting instrument to travel.

15. The method of claim 1 wherein the path selected is a path of said plurality of paths which, if followed by said cutting instrument in between said cutting instrument cutting said features, would pass over the fewest number of previously cut features of said plurality of paths.

16. The method of claim 1 wherein said non-cutting movements of said cutting instrument pass over the fewest number of previously cut features that said cutting instrument would pass over if said cutting instrument were to follow any of said plurality of paths.

17. The method of claim 1 wherein said non-cutting movements of said cutting instrument do not pass over at least one previously cut feature.

18. The method of claim 1 wherein said non-cutting movements of said cutting instrument do not pass over a plurality of previously cut features.

19. The method of claim 1 wherein said non-cutting movements of said cutting instrument do not pass over any previously cut features.

20. The method of claim 1 wherein said features comprise separate parts to be cut.

21. The method of claim 1 wherein said features comprise respective areas which are to be cut in a single part.

22. The method of claim 1 wherein said cutting instrument does not undergo any head-up movement during said non-cutting movements.

23. The method of claim 1 wherein the step of selecting a path includes considering at least a respective one of said features as having a shape of a respective boundary box which surrounds said respective feature.

24. The method of claim 23 wherein said respective boundary box comprises a rectangular area defined by X-minimum, X-maximum, Y-maximum and Y-minimum coordinates of said respective feature.

25. The method of claim 1 comprising performing a plurality of sweeps to determine said respective sequences.

26. The method of claim 25 wherein said plurality of sweeps includes at least one of an X-sweep, a Y-sweep, a radial pie sweep and a radial wave sweep.

27. The method of claim 25 wherein said step of performing a plurality of sweeps includes the use of a plurality of bands for each respective sweep.

28. The method of claim 27 wherein twenty to forty bands are used for each respective sweep.

29. A method of using a machine for cutting features in material, said machine having a cutting instrument, said cutting instrument undergoing cutting movements while cutting said features and non-cutting movements while traveling between said features and said cutting movements, said method comprising the steps of:
   (a) creating a data file that contains a description of a plurality of features to be cut in said material;
   (b) identifying a plurality of paths, each respective path of said plurality of paths comprising each respective non-cutting movement which said cutting instrument would follow between each of said features arranged in a respective sequence if said cutting instrument were to follow said respective path;

(c) selecting a path from said plurality of paths based on criteria which includes determination of which of said plurality of paths, if followed by said cutting instrument in between cutting said features, would pass over the fewest number of previously cut features; and (d) causing said cutting instrument to follow the path selected.

30. A computer readable medium storing an application program that defines a method of using a machine for cutting features in material, said machine having a cutting instrument, said cutting instrument undergoing cutting movements while cutting said features and non-cutting movements while traveling between said features and said cutting movements, said method comprising the steps of:

(a) creating a data file that contains a description of a plurality of features to be cut in said material;

(b) identifying a plurality of paths, each respective path of said plurality of paths comprising each respective non-cutting movement which said cutting instrument would follow between each of said features arranged in a respective sequence if said cutting instrument were to follow said respective path;

(c) selecting a path from said plurality of paths based on criteria which includes determination of which of said plurality of paths, if followed by said cutting instrument in between cutting said features, would pass over the fewest number of previously cut features;

(d) utilizing said path selected to create a tool path for said cutting instrument to follow, said tool path comprising said cutting movements and said non-cutting movements; and (e) causing said cutting instrument to follow said tool path.

31. A method as implemented on a computer in a machine tool system having a machine for cutting features in material, said machine having a cutting instrument, said cutting instrument undergoing cutting movements while cutting said features and non-cutting movements while traveling between said features and said cutting movements, said method comprising the steps of:

(a) creating a data file that contains a description of a plurality of features to be cut in said material;

(b) identifying a plurality of paths, each respective path of said plurality of paths comprising each respective non-cutting movement which said cutting instrument would follow between each of said features arranged in a respective sequence if said cutting instrument were to follow said respective path;

(c) selecting a path from said plurality of paths based on criteria which includes determination of which of said plurality of paths, if followed by said cutting instrument in between cutting said features, would pass over the fewest number of previously cut features;

(d) utilizing said path selected to create a tool path for said cutting instrument to follow, said tool path comprising said cutting movements and said non-cutting movements; and (e) causing said cutting instrument to follow said tool path.

32. A method of using a machine to cut features in material, said machine having a cutting instrument, said cutting instrument undergoing cutting movements while cutting said features and non-cutting movements while traveling between said features and said cutting movements, said method comprising the steps of:

(a) identifying a plurality of paths, each respective of said plurality of paths comprising each respective non-cutting movement which said cutting instrument would follow between each of said features arranged in a respective sequence if said cutting instrument were to follow said respective path;

(b) selecting a path from said plurality of paths based on criteria which includes determination of which of said plurality of paths, if followed by said cutting instrument in between cutting said features, would pass over the fewest number of previously cut features;

(c) utilizing said path selected to create a tool path for said cutting instrument to follow, said tool path comprising said cutting movements and said non-cutting movements; and (d) causing said cutting instrument to follow said tool path.

33. A computer readable medium storing an application program that defines a method of using a machine for cutting features in material, said machine having a cutting instrument, said cutting instrument undergoing cutting movements while cutting said features and non-cutting movements while traveling between said features and said cutting movements, said method comprising the steps of:

(a) identifying a plurality of paths, each respective path of said plurality of paths comprising each respective non-cutting movement which said cutting instrument would follow between each of said features arranged in a respective sequence if said cutting instrument were to follow said respective path;

(b) selecting a path from plurality of paths based on criteria which includes determination of which of said plurality of paths, if followed by said cutting instrument in between cutting said features, would pass over the fewest number of previously cut features;

(c) utilizing said path selected to create a tool path for said cutting instrument to follow, said tool path comprising said cutting movements and said non-cutting movements; and (d) causing said cutting instrument to follow said tool path.

34. A method of using a machine to cut features in material, said machine having a cutting instrument, said cutting instrument undergoing cutting movements while cutting said features and non-cutting movements while traveling between said features and said cutting movements, said method comprising the steps of:

(a) determining a plurality of respective sequences of said features;

(b) determining a plurality of paths, said step of determining a plurality of paths including determining a respective path for each respective sequence of said plurality of sequences of said features by considering said features in reverse order of said respective sequence;

(c) selecting a path from said plurality of paths;

(d) utilizing said path selected to create a tool path for said cutting instrument to follow, said tool path comprising said cutting movements and said non-cutting movements; and (e) causing said cutting instrument to follow said tool path.

* * * * *